（12）United States Patent
Stafford

(10) Patent No.: US 10,228,543 B2
(45) Date of Patent: Mar. 12, 2019

(54) ZOOM APPARATUS AND ASSOCIATED METHODS

(71) Applicant: Sony Interactive Entertainment Inc., Tokyo (JP)

(72) Inventor: Jeffrey Stafford, Redwood City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 70 days.

(21) Appl. No.: 15/476,894

(22) Filed: Mar. 31, 2017

(65) Prior Publication Data

US 2018/0284392 A1    Oct. 4, 2018

(51) Int. Cl.
| | |
|---|---|
| *G02B 13/00* | (2006.01) |
| *A63F 13/213* | (2014.01) |
| *A63F 13/24* | (2014.01) |
| *A63F 13/98* | (2014.01) |
| *G02B 15/00* | (2006.01) |
| *G02B 15/10* | (2006.01) |
| *G02B 15/14* | (2006.01) |
| *H04N 5/232* | (2006.01) |
| *G06F 3/00* | (2006.01) |

(Continued)

(52) U.S. Cl.
CPC .......... *G02B 13/009* (2013.01); *A63F 13/213* (2014.09); *A63F 13/24* (2014.09); *A63F 13/98* (2014.09); *G02B 7/14* (2013.01); *G02B 13/0055* (2013.01); *G02B 15/00* (2013.01); *G02B 15/10* (2013.01); *G06F 3/00* (2013.01); *H04N 5/2254* (2013.01); *H04N 5/232* (2013.01)

(58) Field of Classification Search
None
See application file for complete search history.

(56) References Cited

U.S. PATENT DOCUMENTS

| | | | |
|---|---|---|---|
| 3,996,593 | A | 12/1976 | Uno et al. |
| 4,099,190 | A | 7/1978 | Tsuruoka |
| 4,439,029 | A | 3/1984 | Okura et al. |

(Continued)

FOREIGN PATENT DOCUMENTS

| | | |
|---|---|---|
| EP | 1852741 A1 | 11/2007 |
| EP | 2607953 A1 | 6/2013 |

OTHER PUBLICATIONS

PCT International Search Report, PCT/US2018/021844, dated Jun. 8, 2018.

*Primary Examiner* — William B Perkey
(74) *Attorney, Agent, or Firm* — Penilla IP, APC

(57) ABSTRACT

A zoom apparatus for a camera of a game system is disclosed. The zoom apparatus has a body structure formed to fit over the camera. The zoom apparatus includes a zoom lens disposed within the body structure so as to be positioned in front of a lens of the camera when the body structure is attached to the camera. The zoom apparatus also includes an optical waveguide disposed within the body structure. The optical waveguide is formed to have an optical input and an optical output. The optical waveguide is formed to receive light into the optical input from a light source on the camera when the body structure is attached to the camera. The optical waveguide is formed to emit light from the optical output into a designated area within a field of view of the lens of the camera when the body structure is attached to the camera.

23 Claims, 22 Drawing Sheets

(51) Int. Cl.
*H04N 5/225* (2006.01)
*G02B 7/14* (2006.01)

(56) References Cited

U.S. PATENT DOCUMENTS

| | | |
|---|---|---|
| 7,848,634 B2 | 12/2010 | Kranz et al. |
| 8,123,622 B1 | 2/2012 | Young et al. |
| 9,110,355 B1* | 8/2015 | Nourbakhsh .......... G03B 15/05 |
| 2004/0218081 A1* | 11/2004 | Lohr ........................ G02B 7/00 |
| | | 348/335 |
| 2005/0286882 A1 | 12/2005 | Iwamoto et al. |
| 2007/0122145 A1* | 5/2007 | Chang ................... G02B 13/009 |
| | | 396/529 |
| 2013/0100538 A1* | 4/2013 | Kim ..................... G02B 13/009 |
| | | 359/683 |
| 2014/0118606 A1* | 5/2014 | Sharma ................ G02B 13/009 |
| | | 348/345 |
| 2014/0267882 A1 | 9/2014 | O'Neill et al. |
| 2015/0070781 A1* | 3/2015 | Cheng ................. G02B 13/009 |
| | | 359/696 |
| 2015/0153544 A1 | 6/2015 | Pedersen |
| 2018/0093176 A1* | 4/2018 | Stafford ................ A63F 13/213 |

* cited by examiner

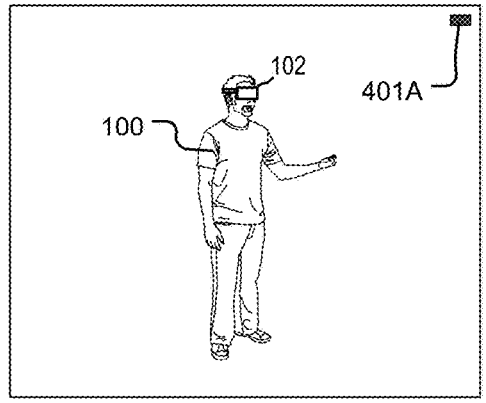
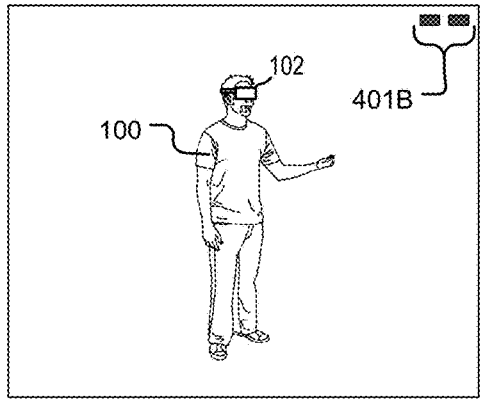
Fig. 4A
Fig. 4B
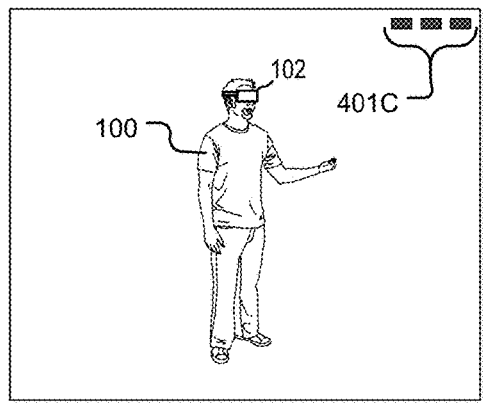
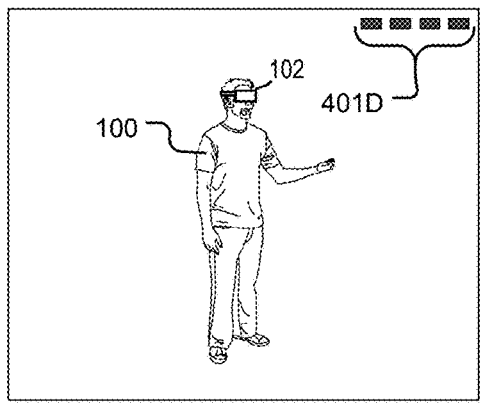
Fig. 4C
Fig. 4D

ZOOM APPARATUS AND ASSOCIATED METHODS

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The computing industry and the video game industry have seen many changes over the years. As computing power has expanded, developers of video games have created game software adapted to the increased computing power. To this end, video game developers have been coding games that incorporate sophisticated operations and mathematics to produce a very realistic game experience.

These games are presented as part of a gaming system including game consoles, portable game devices, and/or provided as services over a server or the cloud. As is well known, the game console is designed to connect to a monitor (usually a television) and enable user interaction through handheld controllers/input devices. A game console may include specialized processing hardware, including a central processing unit (CPU), a graphics processing unit (GPU) for processing intensive graphics operations, a vector unit for performing geometric transformations, and other glue hardware, firmware, and software. The game console may be further designed with an optical disc tray for receiving game compact discs for local play through the game console. Online and multi-player gaming is also possible, where a user can interactively play against or with other users over the Internet. As game complexity continues to intrigue players, game and hardware manufacturers have continued to innovate to enable additional and more realistic interactivity.

A growing trend in the computer gaming industry is to develop games that increase the interaction between the user and the gaming system. One way of accomplishing a richer interactive experience is to use wireless game controllers whose movement and gestures are tracked by the gaming system. These movements and gestures are used as inputs for the game. Gesture inputs, generally speaking, refer to having an electronic device such as a computing system, video game console, smart appliance, etc., react to some gesture made by the user while playing the game that are captured by the electronic device.

Another way of accomplishing a more immersive interactive experience is to use a head-mounted display (HMD). The HMD is worn by the user and can be configured to present various graphics, such as a view of a virtual space, in a display portion of the HMD. The graphics presented within the HMD can cover a large portion or even all of a user's field of view. Hence, the HMD can provide an immersive experience to the user. As connectivity to the Internet continues to increase, more configurations of HMD systems have been introduced.

The HMD can also be used in a virtual reality system in which a user becomes visually immersed in a computer generated three-dimensional virtual reality scene. In some applications, the entire virtual reality scene as displayed to the user is computer generated. In other applications, a portion of the virtual reality scene is computer generated, with another portion of the virtual reality scene corresponding to video and/or images of real-life objects and/or persons, where such real-life video/images can be rendered in the virtual reality scene in essentially real-time. Such applications may be referred to augmented reality applications.

In various situations, it is necessary to track objects that are visible within the real-world environment associated with the user. For example, it may be necessary to track movements of one or more controller objects, and/or the HMD, and/or other physical objects, including the user. Object tracking can be done by processing images captured by a camera disposed to view the real-world environment associated with the user. It is within this context that the present invention arises.

SUMMARY

In an example embodiment, a zoom apparatus for a camera of a game system is disclosed. The zoom apparatus includes a body structure formed to fit over the camera. The zoom apparatus includes a zoom lens disposed within the body structure so as to be positioned in front of a lens of the camera when the body structure is attached to the camera. The zoom apparatus also includes an optical waveguide disposed within the body structure. The optical waveguide is formed to have an optical input and an optical output. The optical waveguide is formed to receive light into the optical input from a light source on the camera when the body structure is attached to the camera. The optical waveguide is formed to emit light from the optical output into a designated area within a field of view of the lens of the camera when the body structure is attached to the camera.

In an example embodiment, a game system is disclosed. The game system includes a processing unit configured to execute program instructions for a computer game. The game system also includes a camera including a lens and image capturing circuitry configured to capture images of a real-world environment associated with a user of the computer game. The camera is configured to communicate captured image data to the processing unit. The game system also includes a zoom apparatus configured to attach to the camera. The zoom apparatus includes an optical waveguide configured to direct light emitted from a light source on the camera into a designated area within a field of view of the lens of the camera to provide an indication to the processing unit of attachment of the zoom apparatus to the camera.

In an example embodiment, a method is disclosed for operating a camera of a game system. The method includes attaching a zoom apparatus to the camera. The zoom apparatus includes an optical waveguide configured to direct light emitted from a light source on the camera into a designated area within a field of view of a lens of the camera. The method also includes operating the camera to emit light from the light source on the camera. The method also includes determining whether or not light from the light source is present within a portion of an image captured by the camera, where the portion of the image corresponds to the designated area within the field of view of the lens of the camera. The method also includes operating the game system in a manner commensurate with the zoom apparatus being present on the camera, upon detecting a presence of the light from the light source within the portion of the image captured by the camera.

Other aspects of the invention will become more apparent from the following detailed description, taken in conjunction with the accompanying drawings, illustrating by way of example the present invention.

BRIEF DESCRIPTION OF THE DRAWINGS

FIGS. 4A, 4B, 4C, and 4D show examples of an image captured through the combination of the camera lens and zoom lens in which different visible patterns of light from the light source are present within the designated area within the field of view of the lens of the camera, in accordance with some embodiments of the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the presented subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

Figure 1:
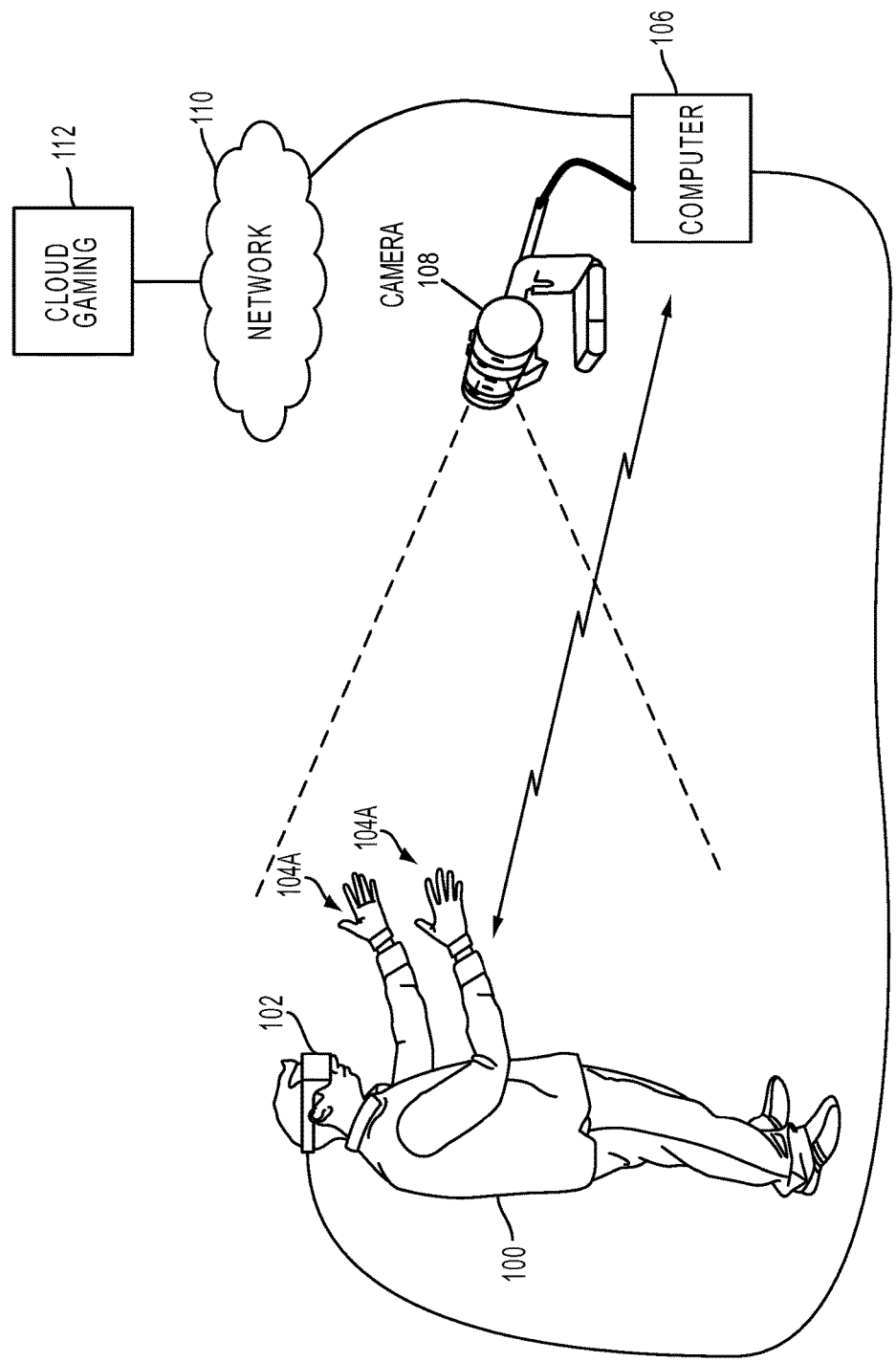
FIG. 1 illustrates a system for interactive gameplay of a video game, in accordance with an embodiment of the disclosure.

FIG. 1 illustrates a system for interactive gameplay of a video game, in accordance with an embodiment of the disclosure. A user 100 is shown wearing a head-mounted display (HMD) 102. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

In one embodiment, the HMD 102 can be connected to a computer 106. The connection to computer 106 can be wired or wireless. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102.

The user 100 may operate one or more glove interface objects 104A to provide input for the video game. Additionally, a camera 108 can be configured to capture images of the interactive environment in which the user 100 is located. These captured images can be analyzed to determine the location and movements of the user 100, the HMD 102, and/or the glove interface objects 104A. In some embodiments, the HMD 102 includes one or more lights which can be tracked by way of images captured and processed by the camera 108 to determine the location and orientation of the HMD 102. Also, in some embodiments, the glove interface objects 104A include a light which can be tracked to determine its location and orientation.

The way the user interfaces with the virtual reality scene displayed in the HMD 102 can vary, and other interface devices in addition to glove interface objects 104A, can be used. For instance, single-handed controllers can also be used, as well as two-handed controllers. In some embodiments, the controllers can be tracked themselves by tracking lights associated with the controllers, and/or tracking of shapes, sensors, and inertial data associated with the controllers. Using these various types of controllers, or even simply hand gestures that are made and captured by one or more of the cameras 108, it is possible to interface, control, maneuver, interact with, and participate in the virtual reality environment presented on the HMD 102.

The camera 108 can also include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In some embodiments, the computer 106 functions as a thin client in communication over a network 110 with a cloud gaming provider 112. The cloud gaming provider 112 maintains and executes the video game being played by the user 102. The computer 106 transmits inputs from the HMD 102, and/or the glove interface objects 104A, and/or the camera 108, to the cloud gaming provider 112. The cloud gaming provider 112 processes the received inputs to affect the game state of the executing video game. The output from the executing video game, such as video data, audio data, and/or haptic feedback data, is transmitted to the computer 106. The computer 106 may further process the data constituting the output from the executing video game before transmission of that output to one or more devices connected to the computer 106, e.g., to the HMD 102 and/or to controller(s), and/or to glove interface object(s) 104A, and/or to display screen(s), and/or to speaker(s), etc. Also, the computer 106 may directly transmit the data constituting the output from the executing video game to one or more devices connected to the computer 106. For example, the computer 106 can provide video and audio streams to the HMD 102, while providing a vibration feedback command to the glove interface objects 104A.

In some embodiments, the HMD 102, and/or the glove interface objects 104A, and/or the camera 108, are themselves networked devices that connect to the network 110 to communicate with the cloud gaming provider 112. For example, the computer 106 may be a local network device, such as a router, that does not otherwise perform video game processing, but which facilitates passage of network traffic. The connections to the network 110 by the HMD 102, and/or the glove interface objects 104A, and/or the camera 108 may be wired or wireless.

Additionally, although embodiments in the present disclosure may be described with reference to the HMD 102, it should be understood that other embodiments can include non-head mounted displays, such as without limitation, a television, a projector, a liquid crystal display (LCD) display screen, a plasma display screen, portable device screen (e.g., tablet, smartphone, laptop, etc.) or any other type of display that can be configured to render video and/or provide for display of an interactive scene or computer generated virtual environment in accordance with the embodiments disclosed herein.

Figure 2A:
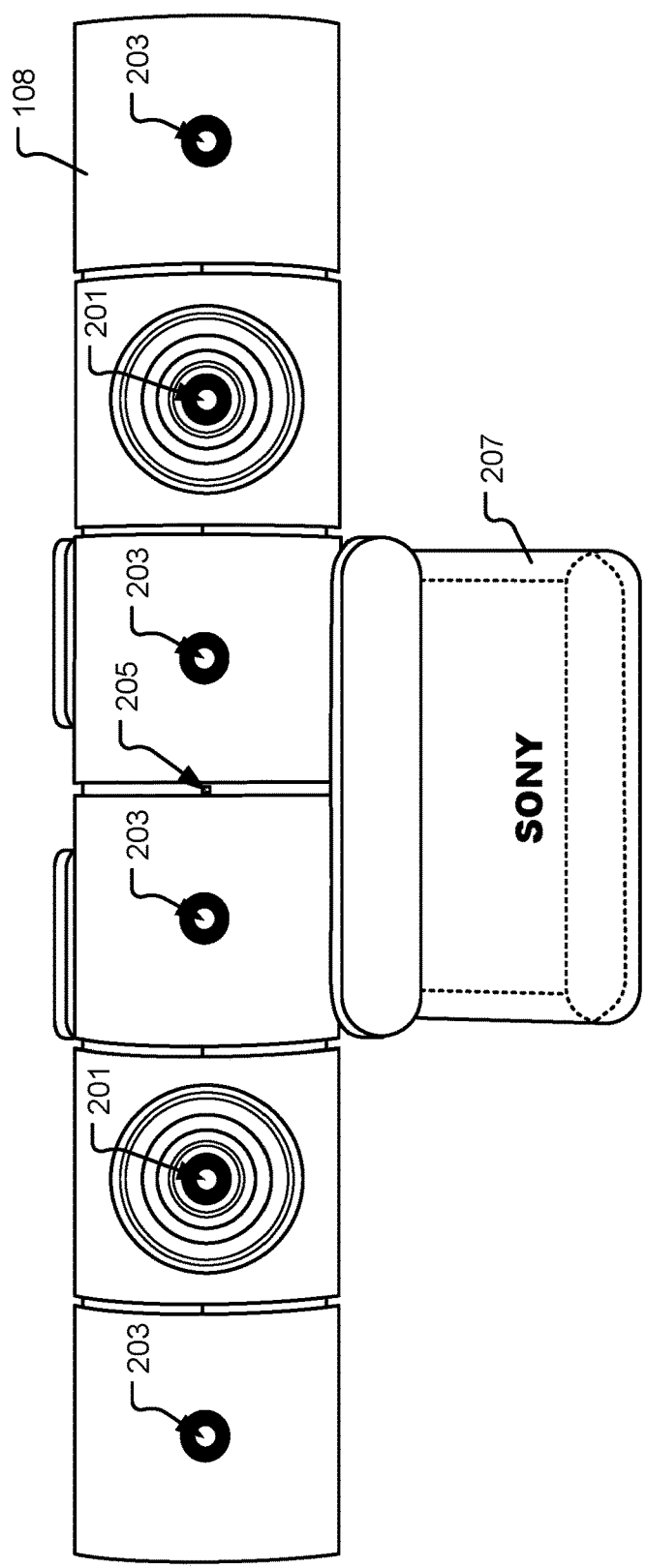
FIG. 2A shows a front view of an example of the camera, in accordance with some embodiments of the present invention.
Figure 2B:
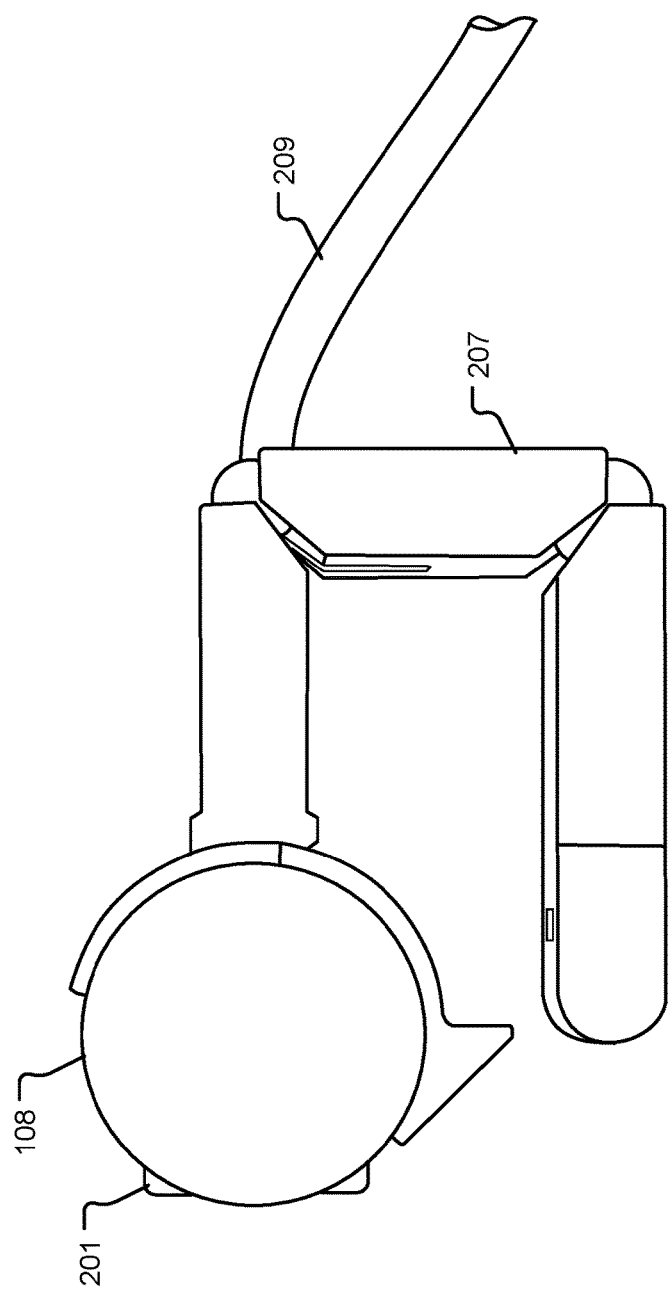
FIG. 2B shows a side view of the example camera as shown in FIG. 2A, in accordance with some embodiments of the present invention.

FIG. 2A shows a front view of an example of the camera 108, in accordance with some embodiments of the present invention. FIG. 2B shows a side view of the example camera 108 as shown in FIG. 2A, in accordance with some embodiments of the present invention. The camera 108 includes two lenses 201 (and respective image capturing circuitry) to enable stereoscopic vision (i.e., depth perception) within the interactive real-world environment surrounding the user 100. The two lenses 201 are positioned at a known and fixed distance apart from each other and are oriented to simultaneously capture images of the same scene, but from slightly different perspectives. Images captured by the two lenses 201 at a given time can be processed to identify common objects within the same scene. Then, based on the known configuration of the two lenses 201 relative to each other, locations of the common objects identified within the two captured images of the same scene at the given time can be processed to determine respective depths/distances of the common objects, or portions thereof, from the camera 108. The depth/distance results for the various objects within the scene can be used to generate a three-dimensional rendering of the interactive real-world environment within which the user 100 is operating.

The camera 108 in the example embodiment of FIGS. 2A-2B also includes a microphone array that includes a number, e.g., four, microphones 203. A light source 205 is also present on the exterior of the camera 108. In some embodiments, the light source 205 is an on/off status indicator light, which can be illuminated to indicate that the camera 108 is turned on. In some embodiments, the light source 205 is a light emitting diode (LED). However, in other embodiments, the light source 205 can be essentially any other type of light source, such as an incandescent light source, a plasma light source, or a halogen light source, among others. A base structure 207 is formed to receive the camera 108 and hold the camera 108 in a secure and stable orientation. A connector 209 is provided to enable bi-directional data communication between the camera 108 and the computer 106 and/or between the camera 108 and the cloud gaming provider 112 by way of the network 110. The connector 209 is also used to supply electrical power to the camera 108. It should be understood that the connector 209 can include multiple electrical wires and can be terminated by any suitable type of connection device, such as a universal serial bus (USB) connection device, or another type of connection device available for use with computer electronics.

Image data captured by the camera 108 is transmitted through the connector 209 to the computer 106 and/or to the cloud gaming provider 112 by way of the network 110. In some embodiments, the camera 108 is equipped with a processor and/or circuitry configured to process, to some extent, images captured through the two lenses 201, prior to transmission of the image data through the connector 209 to the computer 106 and/or cloud gaming provider 112. In some embodiments, operations of the camera 108 can be controlled by signals received at the camera 108 from the computer 106 and/or the cloud gaming provider 112. For example, in some embodiments, signals can be transmitted to the camera 108 to turn the camera on/off, to control an exposure of the images captured by the camera 108, to control a frame rate at which the camera 108 captures images to compose video input, and/or to control illumination of the light source 205 present on the exterior of the camera 108. For example, in some embodiments, signals can be transmitted to the camera 108 to turn the light source 205 on/off, to adjust a brightness of the light source 205, and/or change a color of the light source 205.

In some embodiments, the two lenses 201 of the camera 108 are configured to have a fixed focal length. In these embodiments, the two lenses 201 of the camera 108 can be optimized to capture images of real-world objects that are visible within a prescribed distance from the camera 108. For example, in some embodiments, the two lenses 201 of the camera 108 are optimized to capture images of real-world objects that are visible within a range of 1 meter to 3 meters from the camera 108. In some situations, the user 100 and/or the user's 100 environment may require the camera 108 to capture images of real-world objects at distances greater than the prescribed distance for which the two lenses 201 are optimized. For example, in a particular situation, it may be more optimal for the camera 108 to capture images of real-world objects that are visible within a range of 3 meters to 5 meters from the camera 108. To this end, various embodiments are disclosed herein for a zoom apparatus for the camera 108.

Figure 3A:
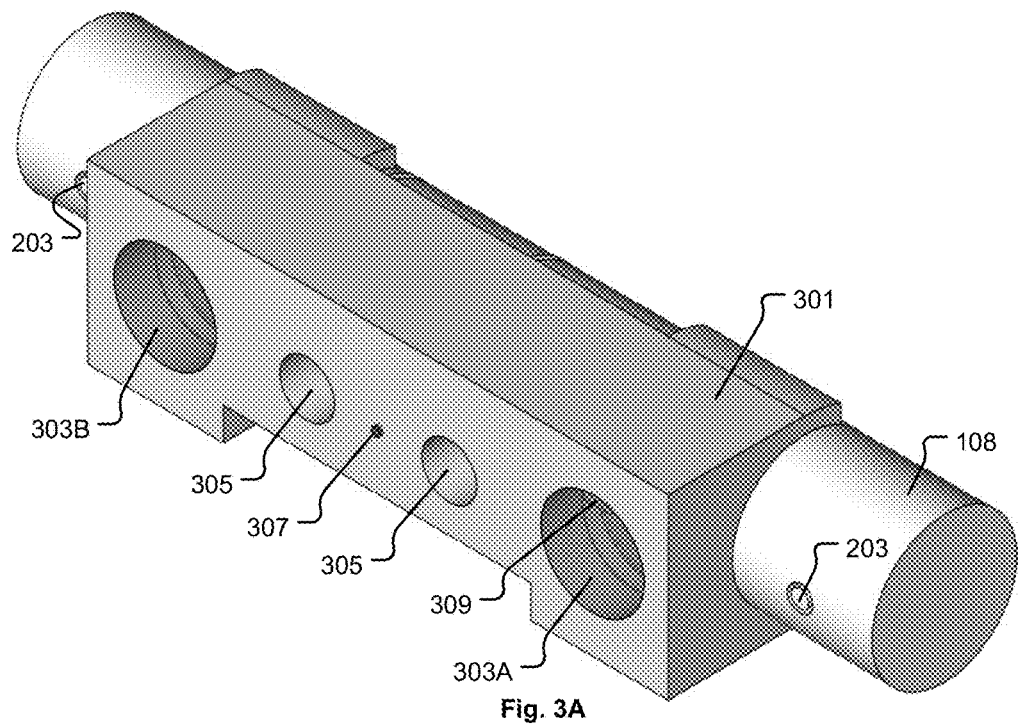
FIG. 3A shows a zoom apparatus attached to the camera, in accordance with some embodiments of the present invention.

FIG. 3A shows a zoom apparatus 301 attached to the camera 108, in accordance with some embodiments of the present invention. The zoom apparatus 301 includes a body structure formed to fit over the camera 108. In some embodiments, the body structure of the zoom apparatus 301 is configured to clip onto the camera 108 in a secured manner. In some embodiments, the body structure of the zoom apparatus 301 is secured to the camera 108 using one or more fasteners and/or clip mechanisms. The zoom apparatus 301 includes a first zoom lens 303A and a second zoom lens 303B disposed within the body structure of the zoom apparatus 301. The first zoom lens 303A and the second zoom lens 303B are respectively positioned in front of the two lenses 201 of the camera 108 when the body structure of the zoom apparatus 301 is attached to the camera 108. In some embodiments, the zoom apparatus 301 includes audio passages 305 formed to allow sound to reach respective microphones 203 of the camera 108.

Figure 3B:
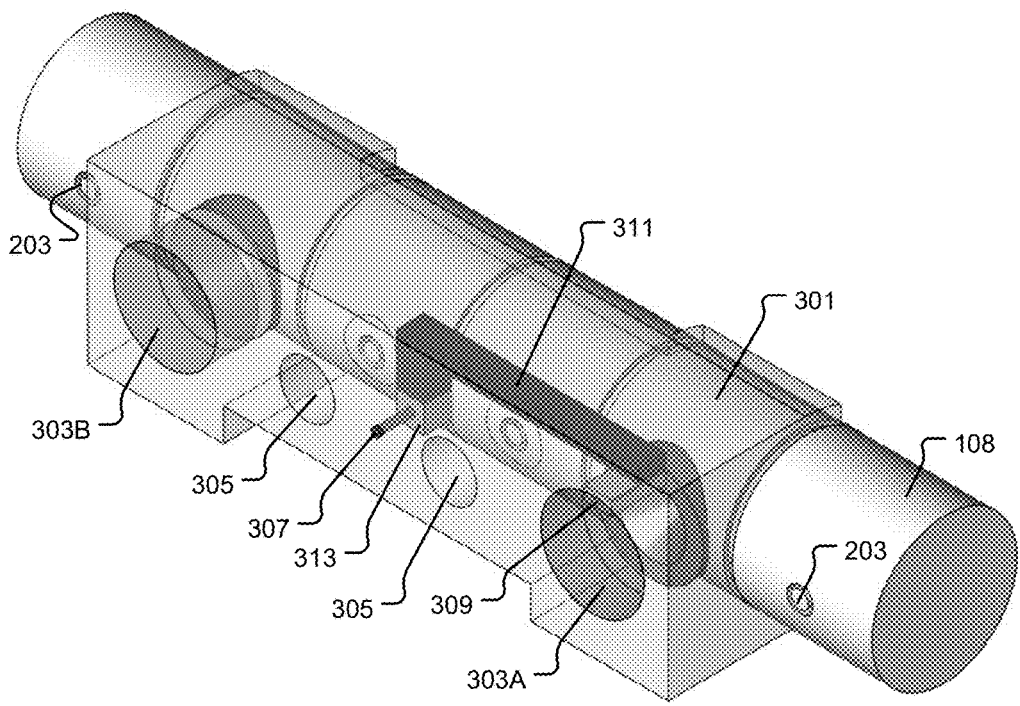
FIG. 3B shows a transparent view of the zoom apparatus of FIG. 3A, in accordance with some embodiments of the present invention.
Figure 3C:
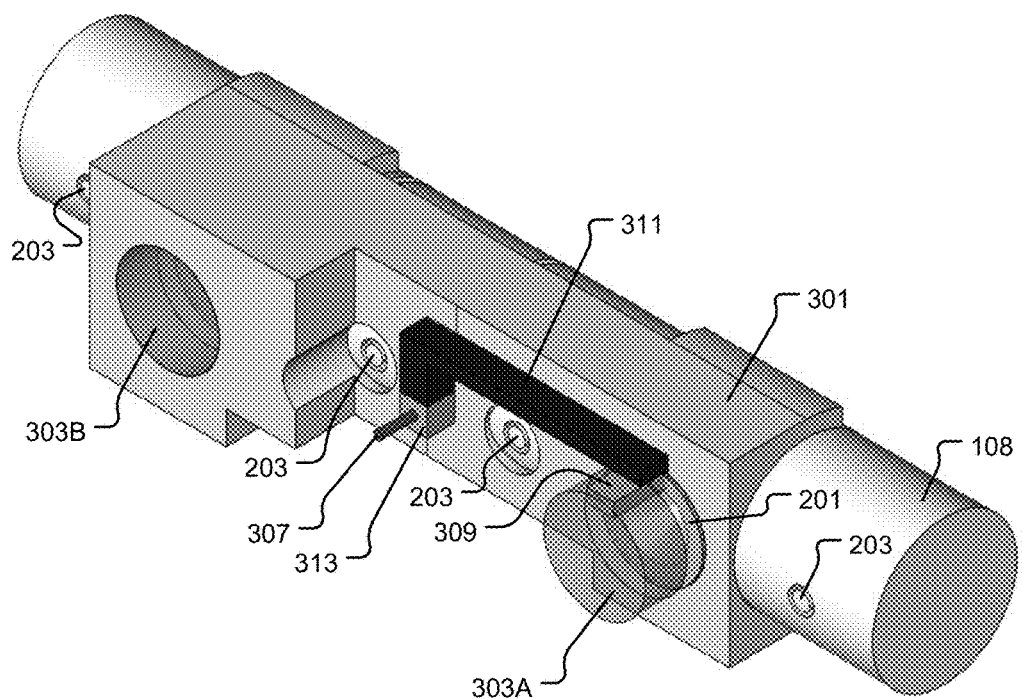
FIG. 3C shows a cut-away view of the zoom apparatus of FIG. 3A to reveal the optical waveguide, in accordance with some embodiments of the present invention.

FIG. 3B shows a transparent view of the zoom apparatus 301 of FIG. 3A, in accordance with some embodiments of the present invention. The zoom apparatus 301 includes an optical waveguide 311 disposed within the body structure of the zoom apparatus 301. The optical waveguide 311 is formed to have an optical input 313 and an optical output 309. FIG. 3C shows a cut-away view of the zoom apparatus 301 of FIG. 3A to reveal the optical waveguide 311, in accordance with some embodiments of the present invention. The optical waveguide 311 is formed to receive light into the optical input 313 from the light source 205 on the camera 108 (see FIG. 2A) when the body structure of the zoom apparatus 301 is attached to the camera 108. The optical waveguide 311 is formed to direct light that enters the optical input 313 over to the optical output 309. The optical waveguide 311 is formed to emit light from the optical output 309 into a designated area within a field of view of the lens 201 of the camera 108 when the body structure of the zoom apparatus 301 is attached to the camera 108. In some embodiments, the optical output 309 from which light is emitted into the designated area within the field of view of the lens 201 of the camera 108 is a first optical output 309, and the optical waveguide 311 includes a second optical output 307 configured to emit some of the light from the light source 205 at an exterior location on the body structure of the zoom apparatus 301. In this manner, the second optical output 307 can provide a substitute status indicator light for the camera 108 when the zoom apparatus 301 is attached to the camera 108.

In some embodiments, the light source 205 on the camera 108 is a status (on/off) indicator light for the camera 108. In some embodiments, the light source 205 on the camera 108 is an LED. In some embodiments, the light source 205 on the camera 108 is controllable by the game system with respect to one or more of brightness, color, on duration, off duration, and blinking/pulsing. In should be understood, however, that in other embodiments, the light source 205 on the camera 108 can be a non-LED type of light source.

In some embodiments, the body structure of the zoom apparatus 301 is formed of a plastic material. However, in other embodiments, the body structure of the zoom apparatus 301 is formed of a metallic material, such as aluminum, among other types of metals. And, in some embodiments, the body structure of the zoom apparatus 301 is formed of a combination of materials, such as a combination of plastic and metallic materials. In some embodiments, the first and second zoom lenses 303A and 303B can be formed of plastic, glass, or a combination thereof. In some embodiments, the optical waveguide 311 includes an optical fiber, such as a single mode optical fiber or multi-mode optical fiber, for providing conveyance of the light from the optical input 313 over to the optical output 309. In some embodiments, the optical waveguide 311 includes planar and/or strip segments formed of material suitable for guiding electromagnetic waves in the optical spectrum, such as glass and/or polymer, and/or semiconductor material. In some embodiments, the optical input 313 includes an optical prism component configured and positioned to direct light emitted from the light source 205 on the camera 108 into the optical waveguide 311. In some embodiments, the optical output 309 includes an optical prism component configured and positioned to direct light from the optical waveguide 311 into the designated area within the field of view of the lens 201 of the camera 108. In some embodiments, the optical waveguide 311 is formed as a combination of optical fiber (s), and/or planar waveguide segment(s), and/or strip waveguide segment(s), and/or prism(s).

Figure 3D:
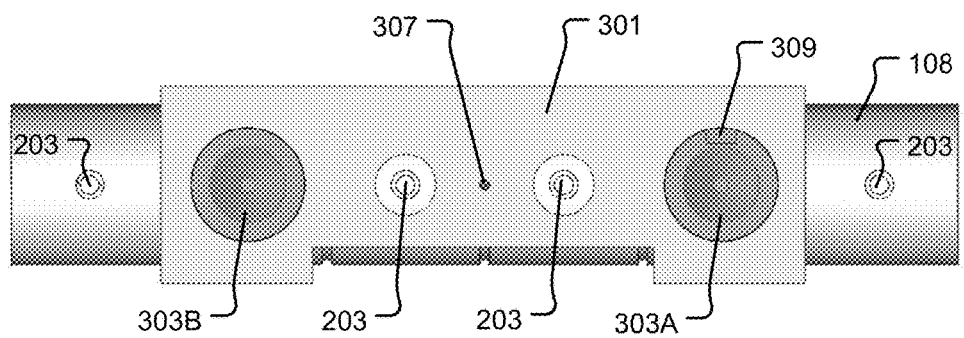
FIG. 3D shows a front view of the zoom apparatus of FIG. 3A attached to the camera, in accordance with some embodiments of the present invention.
Figure 3E:
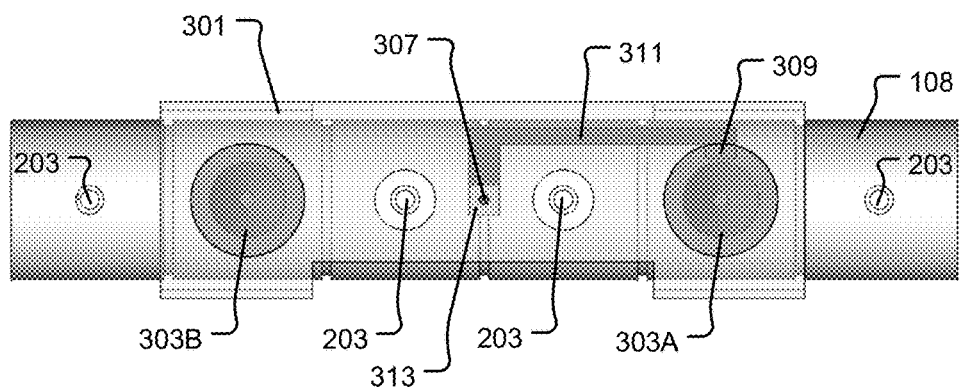
FIG. 3E shows a transparent front view of the zoom apparatus of FIG. 3A attached to the camera, in accordance with some embodiments of the present invention.
Figure 3F:
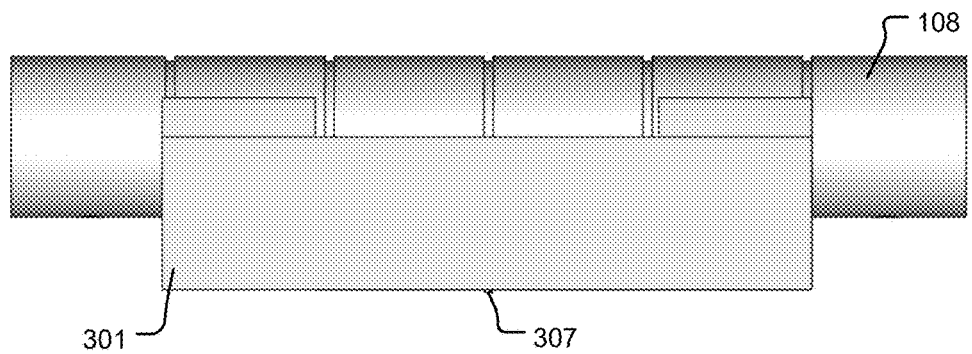
FIG. 3F shows a top view of the zoom apparatus of FIG. 3A attached to the camera, in accordance with some embodiments of the present invention.
Figure 3G:
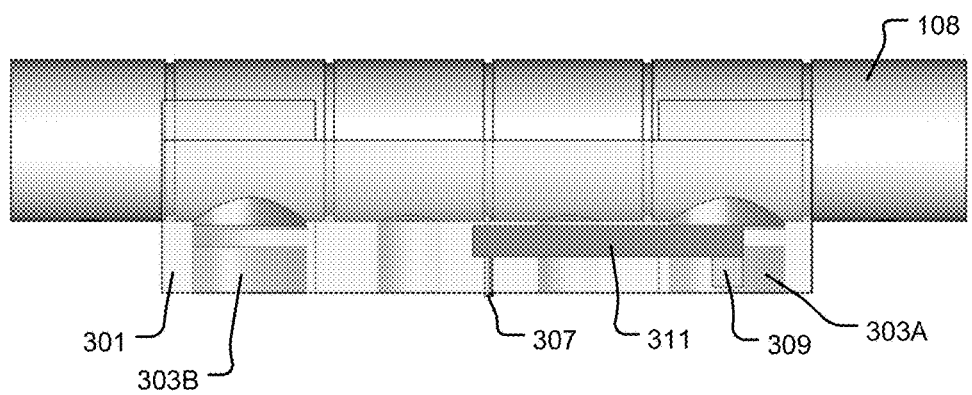
FIG. 3G shows a transparent top view of the zoom apparatus of FIG. 3A attached to the camera, in accordance with some embodiments of the present invention.
Figure 3H:
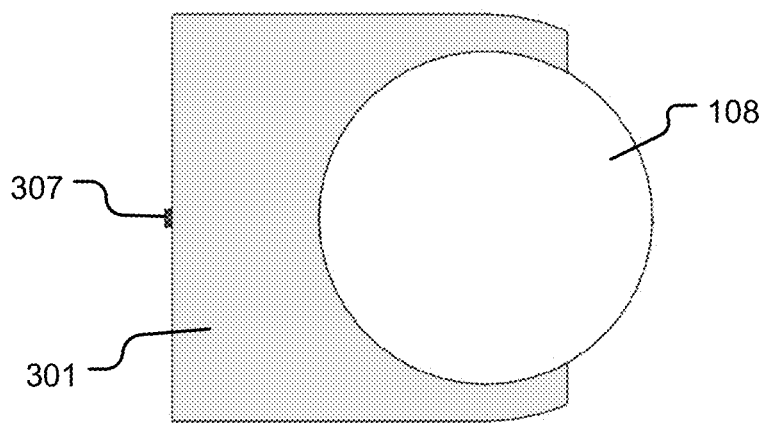
FIG. 3H shows a right-side view of the zoom apparatus of FIG. 3A attached to the camera, in accordance with some embodiments of the present invention.
Figure 3I:
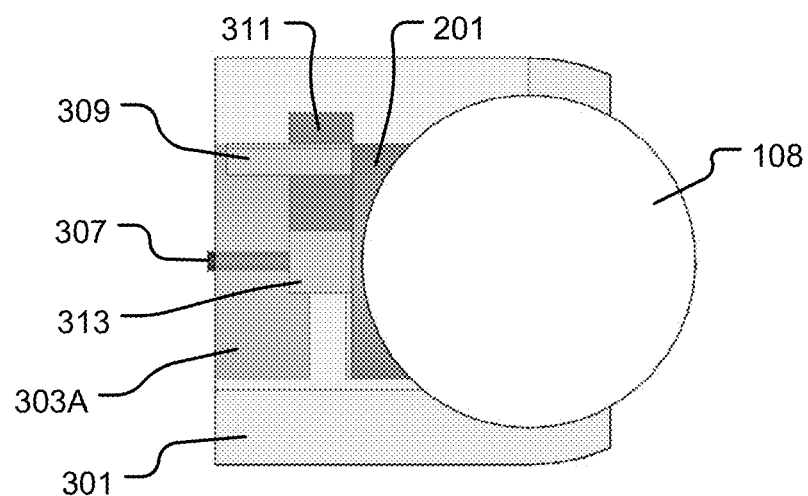
FIG. 3I shows a transparent right-side view of the zoom apparatus of FIG. 3A attached to the camera, in accordance with some embodiments of the present invention.

FIG. 3D shows a front view of the zoom apparatus 301 of FIG. 3A attached to the camera 108, in accordance with some embodiments of the present invention. FIG. 3E shows a transparent front view of the zoom apparatus 301 of FIG. 3A attached to the camera 108, in accordance with some embodiments of the present invention. FIG. 3F shows a top view of the zoom apparatus 301 of FIG. 3A attached to the camera 108, in accordance with some embodiments of the present invention. FIG. 3G shows a transparent top view of the zoom apparatus 301 of FIG. 3A attached to the camera 108, in accordance with some embodiments of the present invention. FIG. 3H shows a right-side view of the zoom apparatus 301 of FIG. 3A attached to the camera 108, in accordance with some embodiments of the present invention. FIG. 3I shows a transparent right-side view of the zoom apparatus 301 of FIG. 3A attached to the camera 108, in accordance with some embodiments of the present invention.

Figure 3J:
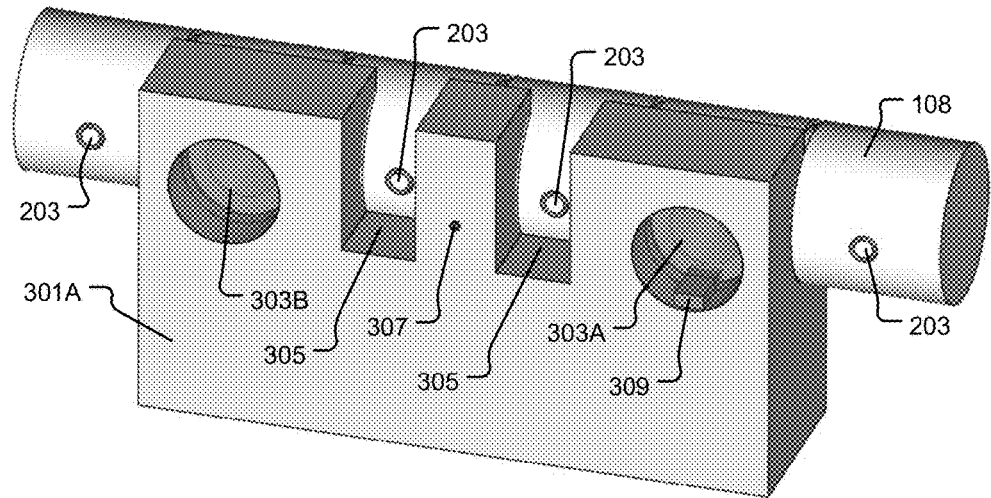
FIG. 3J shows a zoom apparatus configured to also function as a stand for the camera, in accordance with some embodiments of the present invention.
Figure 3K:
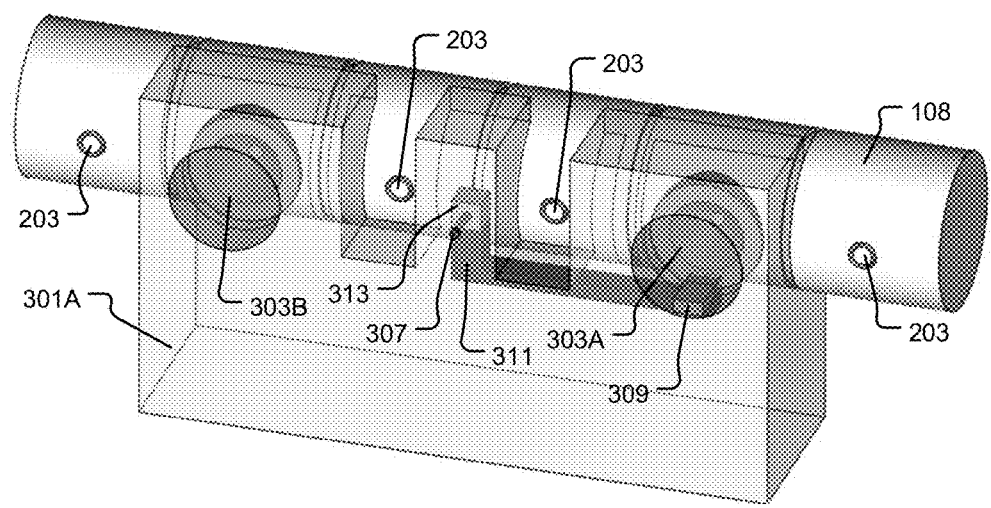
FIG. 3K shows a transparent view of the zoom apparatus, in accordance with some embodiments.
Figure 3L:
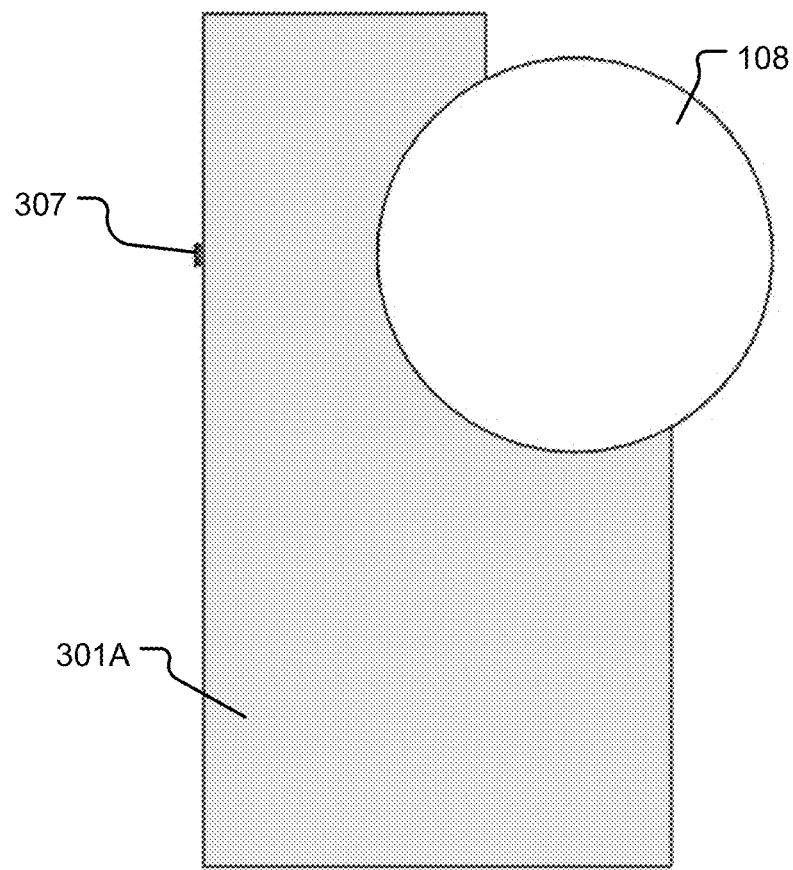
FIG. 3L shows a right-side view of the zoom apparatus, in accordance with some embodiments of the present invention.

In some embodiments, the zoom apparatus itself can also function as a stand for the camera 108, with the camera 108 clipping into the zoom apparatus or sitting within the zoom apparatus. For example, FIG. 3J shows a zoom apparatus 301A configured to also function as a stand for the camera 108, in accordance with some embodiments of the present invention. The zoom apparatus 301A is a modification of the zoom apparatus 301. However, it should be understood that any of the zoom apparatus embodiments disclosed herein can be modified to also function as a stand for the camera 108, in a manner similar to what is depicted for the zoom apparatus 301A. FIG. 3K shows a transparent view of the zoom apparatus 301A, in accordance with some embodiments. FIG. 3L shows a right-side view of the zoom apparatus 301A, in accordance with some embodiments of the present invention. As shown in FIG. 3K, the optical waveguide 311 is positioned within a lower portion of the body structure of the zoom apparatus 301A to convey light from the light source 205 on the camera 108 to the optical output 309. It should be understood that in various embodiments, the configuration of the waveguide 311 and optical output 309 can be modified to optimize an overall design and configuration of the zoom apparatus 301A for a particular camera 108 configuration.

In some embodiments, the computer system 106 and/or cloud gaming provider 112 can operate to display a zoom dialog interface to the user, either within the HMD 102 or on a display screen visible to the user 100, to request that the user 100 enter a current zoom setting corresponding to the attached zoom apparatus 301. However, this approach relies upon the user 100 to provide the correct zoom setting information, and is vulnerable to mistake. If the user 100 does not enter the correct zoom setting, camera-based object tracking operations performed by the computer system 106 and/or cloud gaming provider 112 can be adversely affected. Therefore, it is desirable for the computer system 106 and/or cloud gaming provider 112 to be capable of automatically detecting when the zoom apparatus 301 is attached to the camera 108. Moreover, it is also desirable for the computer system 106 and/or cloud gaming provider 112 to be capable of automatically detecting a zoom level/setting of the zoom apparatus 301 when it is attached to the camera 108.

In various embodiments, one or more of the camera 108, the computing system 106, and the cloud gaming provider 112 is/are configured to process images captured through the lens 201 of the camera 108 to determine whether or not light emitted from the light source 205 on the camera 108 is present within the designated area within the field of view of the lens 201 of the camera 108, thereby indicating attachment of the zoom apparatus 301 to the camera 108. Also, in various embodiments, one or more of the camera 108, the computing system 106, and the cloud gaming provider 112 is/are configured to process images captured through the lens 201 of the camera 108 to identify a visible pattern formed by the light from the light source 205 that is present within the designated area within the field of view of the lens 201 of the camera 108, where the identified visible pattern indicates a zoom level/setting of the zoom apparatus 301.

FIGS. 4A through 4D show examples of an image captured through the combination of the camera lens 201 and zoom lens 303A in which different visible patterns of light 401A, 401B, 401C, 401D from the light source 205 are present within the designated area within the field of view of the lens 201 of the camera 108, in accordance with some embodiments of the present invention. In FIG. 4A, the visible pattern of light 401A includes one shape formed by the light from the light source 205, as transmitted through the optical input 313 and the optical waveguide 311 and the optical output 309, to indicate both the presence of the zoom apparatus 301 on the camera 108 and that the zoom apparatus 301 has a first zoom level/setting. In FIG. 4B, the visible pattern of light 401B includes two shapes formed by the light from the light source 205, as transmitted through the optical input 313 and the optical waveguide 311 and the optical output 309, to indicate both the presence of the zoom apparatus 301 on the camera 108 and that the zoom apparatus 301 has a second zoom level/setting. In FIG. 4C, the visible pattern of light 401C includes three shapes formed by the light from the light source 205, as transmitted through the optical input 313 and the optical waveguide 311 and the optical output 309, to indicate both the presence of the zoom apparatus 301 on the camera 108 and that the zoom apparatus 301 has a third zoom level/setting. In FIG. 4D, the visible pattern of light 401D includes four shapes formed by the light from the light source 205, as transmitted through the optical input 313 and the optical waveguide 311 and the optical output 309, to indicate both the presence of the zoom apparatus 301 on the camera 108 and that the zoom apparatus 301 has a fourth zoom level/setting.

It should be understood that display and recognition of light from the light source 205 within the designated area within the field of view of the lens 201 of the camera 108 can be used to convey essentially any type of information about the zoom apparatus 301. Also, it should be understood that the zoom apparatus 301 operates in a passive manner to direct the light from the light source 205 into the lens 201 of the camera 108 and does not require additional electronics or electrical power.

In some embodiments, the camera 108 can be operated to blink/pulse the light source 205 to facilitate detection of the visible pattern of the light from the light source 205 within the designated area within the field of view of the lens 201 of the camera 108. In some embodiments, the camera 108 can be operated to change a color of the light source 205 to facilitate detection of the visible pattern of the light from the light source 205 within the designated area within the field of view of the lens 201 of the camera 108. In some embodiments, the camera 108 and/or the computing system 106 and/or the cloud gaming provider 112 is operated to determine a dominant color present within the image at the designated area within the field of view of the lens 201 of the camera 108, and is further operated to adjust the color of the light source 205 to better contrast with the determined dominant color. In some embodiments, the camera 108 can be operated to change a brightness of the light source 205 to facilitate detection of the visible pattern of the light from the light source 205 within the designated area within the field of view of the lens 201 of the camera 108. In some embodiments, the camera 108 can be operated to apply a combination of blinking/pulsing and/or color changing and/or brightness changing of the light source 205 to facilitate detection of the visible pattern of the light from the light source 205 within the designated area within the field of view of the lens 201 of the camera 108. Also, in some embodiments, one or more of the camera 108, the computing system 106, and the cloud gaming provider 112 is/are configured to differentially process the two images captured through the two lenses 201 of the camera 108 at a given time to determine whether or not light emitted from the light source 205 is present within the designated area within the field of view of the one lens 201 of the camera 108 and what visible pattern is formed by the light.

In some embodiments, the optical waveguide 311 and the optical output 309 are configured to project the light from the light source 205 into a small area in a corner of the field of view of the lens 201 of the camera 108 so as to not obscure the image captured through the lens 201 of the camera 108. In some embodiments, the optical waveguide 311 and the optical output 309 are configured to project the light from the light source 205 onto an edge row of pixels within the image captured through the lens 201 of the camera 108. In some embodiments, the optical waveguide 311 and the optical output 309 are configured to project the light from the light source 205 into a cropped region of the image captured through the lens 201 of the camera 108, where the cropped region is visible to the camera 108 and/or the computing system 106 and/or the cloud gaming provider 112 for analysis but is cropped away prior to analysis of the captured images for object tracking purposes. In some embodiments, the cropped region may be one to five pixels wide from an edge of the captured image. In some embodiments, the cropped region may be two pixels wide from an edge of the captured image. In various example embodiments, the visible pattern of light from the light source 205 that is projected into the designated area within the field of view of the lens 201 of the camera 108 can be one or more dots, or have a particular geometric shape. In some embodiments, multiple designated areas within the field of view of the lens 201 of the camera 108 can be processed to determine which of the multiple designated areas includes light from the light source 205 at a given time, and the particular one or more of the multiple designated areas that include(s) light from the light source 205 at the given time can indicate a particular zoom level/setting of the zoom apparatus 301.

Figure 5A:
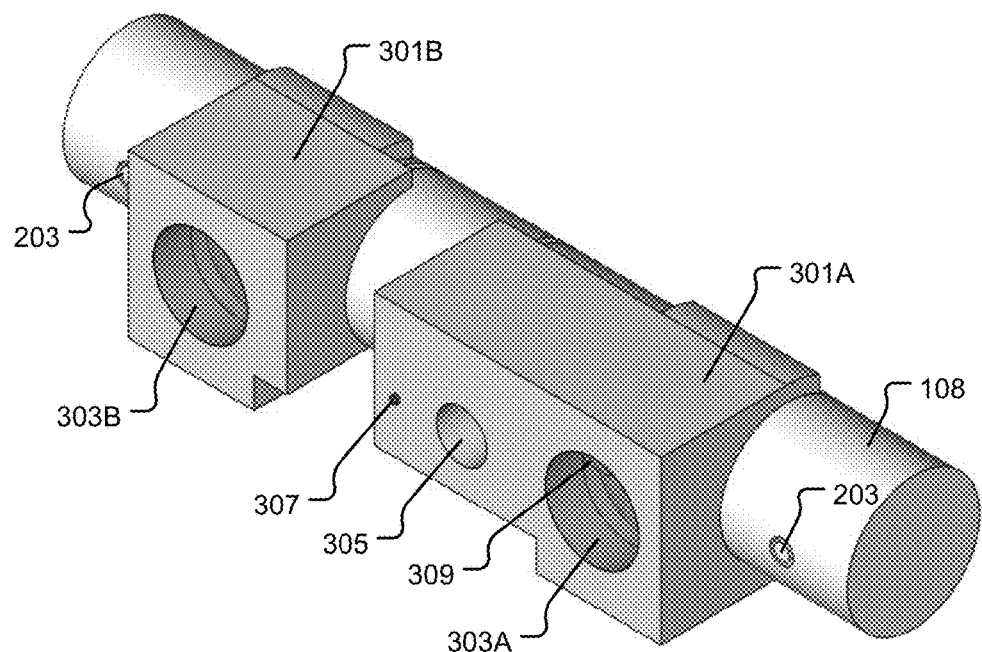
FIG. 5A shows a variation of the zoom apparatus in which the zoom apparatus is separated into a first component and a second component, in accordance with some embodiments of the present invention.
Figure 5B:
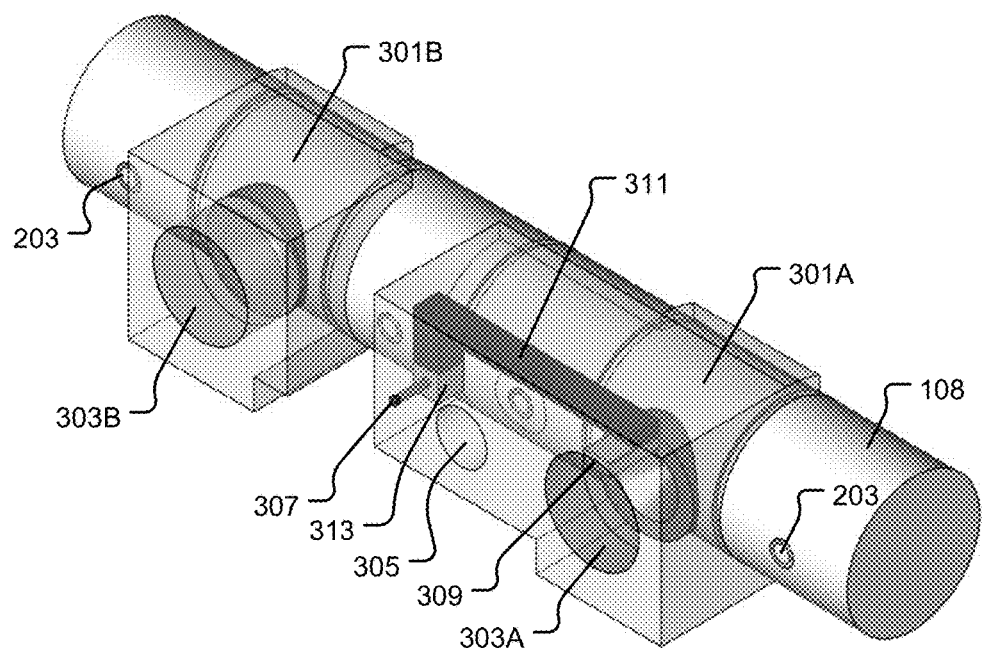
FIG. 5B shows a transparent view of the variation of the zoom apparatus as shown in FIG. 5A, in accordance with some embodiments of the present invention.

The zoom apparatus 301 is configured to direct light from the light source 205 on the camera 108 into the designated area within the field of view of one of the two lenses 201 of the camera 108. Therefore, in some embodiments the zoom apparatus 301 can be structurally divided into two separate components for the two lenses 201 of the camera 108, respectively. FIG. 5A shows a variation of the zoom apparatus 301 in which the zoom apparatus 301 is separated into a first component 301A and a second component 301B, in accordance with some embodiments of the present invention. FIG. 5B shows a transparent view of the variation of the zoom apparatus 301 as shown in FIG. 5A, in accordance with some embodiments of the present invention. The first component 301A includes the zoom lens 303A, the optical input 313, the optical waveguide 311, the first optical output 309, and the second optical output 307. The second component 301B includes the zoom lens 303B. It should be understood that in the embodiment of FIGS. 5A and 5B, the first component 301A and the second component 301B are physically separate from each other. In various embodiments, the split configuration of the zoom apparatus 301 may facilitate attachment of the zoom apparatus 301 to the camera 108.

Figure 6A:
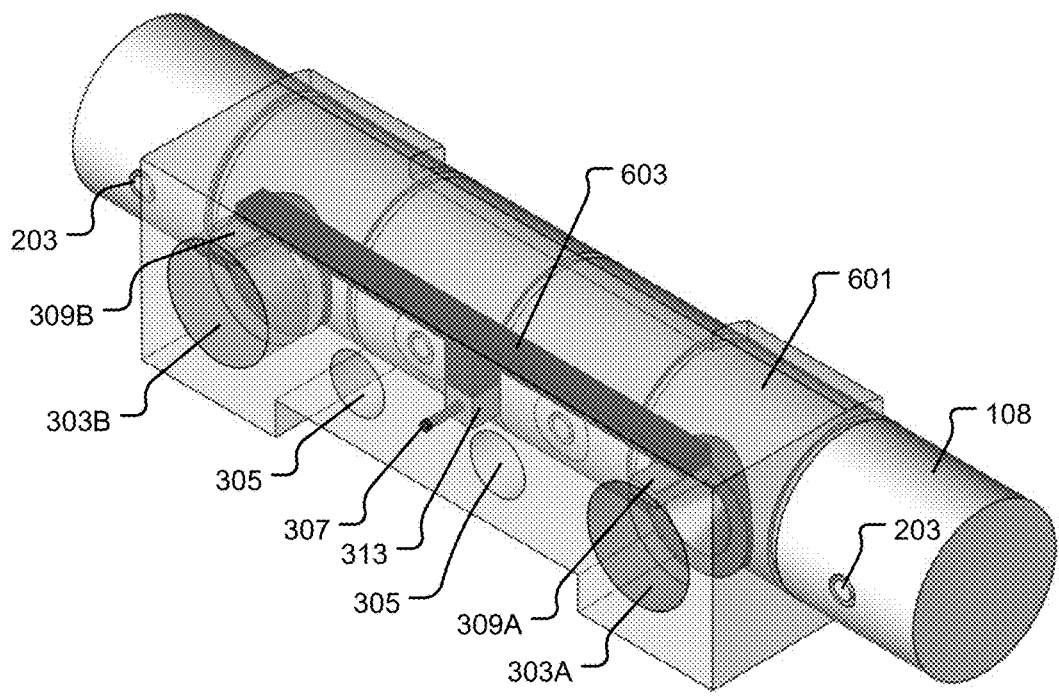
FIG. 6A shows a transparent view of a zoom apparatus attached to the camera, in which the zoom apparatus is configured to direct light from the light source on the camera into both lenses of the camera, in accordance with some embodiments of the present invention.
Figure 6B:
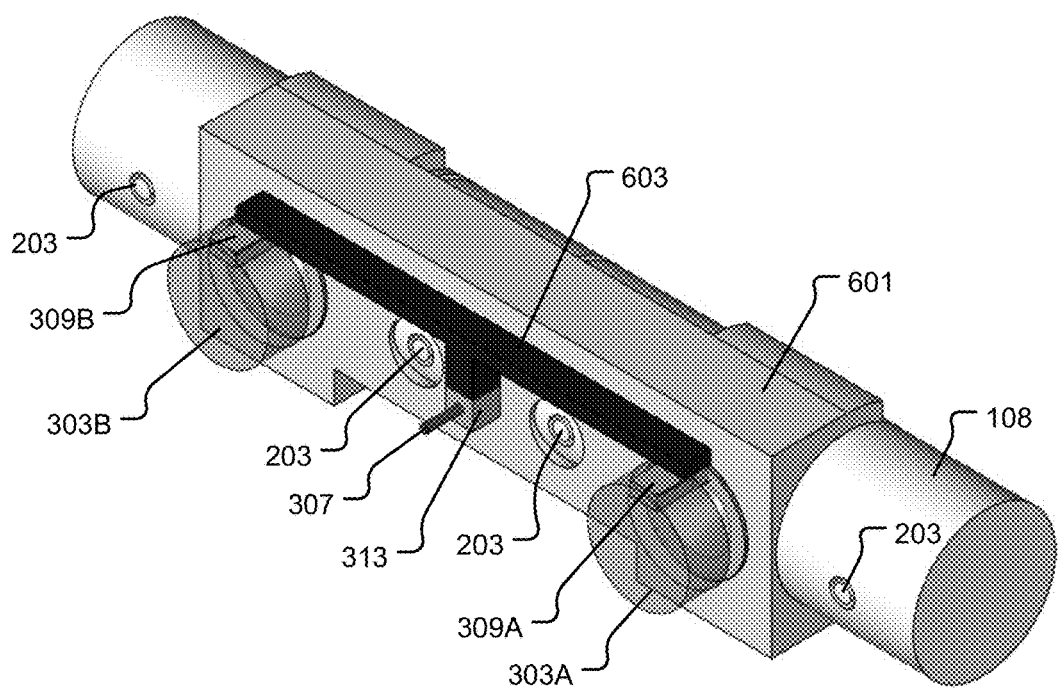
FIG. 6B shows a cut-away view of the zoom apparatus of FIG. 6A to reveal the optical waveguide, in accordance with some embodiments of the present invention.

FIG. 6A shows a transparent view of a zoom apparatus 601 attached to the camera 108, in which the zoom apparatus 601 is configured to direct light from the light source 205 on the camera 108 into both lenses 201 of the camera 108, in accordance with some embodiments of the present invention. The exterior solid view of the zoom apparatus 601 is essentially the same as that shown in FIG. 3A for the zoom apparatus 301. The zoom apparatus 601 includes the first zoom lens 303A, the second zoom lens 303B, the audio passages 305, the optical input 313, and the second optical output 307, as previously described with regard to the zoom apparatus 301. The zoom apparatus 601 also includes an optical waveguide 603 configured to direct light from the optical input 313 to each of a first optical output 309A and a third optical output 309B. The first optical output 309A is configured to direct light into a designated area within a field of view of the corresponding lens 201 of the camera 108. Similarly, the third optical output 309B is configured to direct light into a designated area within a field of view of the corresponding lens 201 of the camera 108. FIG. 6B shows a cut-away view of the zoom apparatus 601 of FIG. 6A to reveal the optical waveguide 603, in accordance with some embodiments of the present invention.

In various embodiments, one or more of the camera 108, the computing system 106, and the cloud gaming provider 112 is/are configured to process images captured through the two lenses 201 of the camera 108 to determine whether or not light emitted from the light source 205 on the camera 108 is present within the designated area within the field of view of each of the lenses 201 of the camera 108, thereby indicating attachment of the zoom apparatus 601 to the camera 108 and a zoom level/setting of the zoom apparatus 601. It should be understood that display and recognition of light from the light source 205 within the designated area within the field of view of each of the lenses 201 of the camera 108 can be used to convey essentially any type of information about the zoom apparatus 601. Also, it should be understood that the zoom apparatus 601 operates in a passive manner to direct the light from the light source 205 into the two lenses 201 of the camera 108 and does not require additional electronics or electrical power. In some embodiments, one or more of the camera 108, the computing system 106, and the cloud gaming provider 112 is/are configured to process the two images captured through the two lenses 201 of the camera 108 at a given time in conjunction with each other to determine whether or not light emitted from the light source 205 is present within the designated area within the field of view of the one or both of the two lenses 201 of the camera 108 and what visible pattern is formed by the light.

Figure 7A:
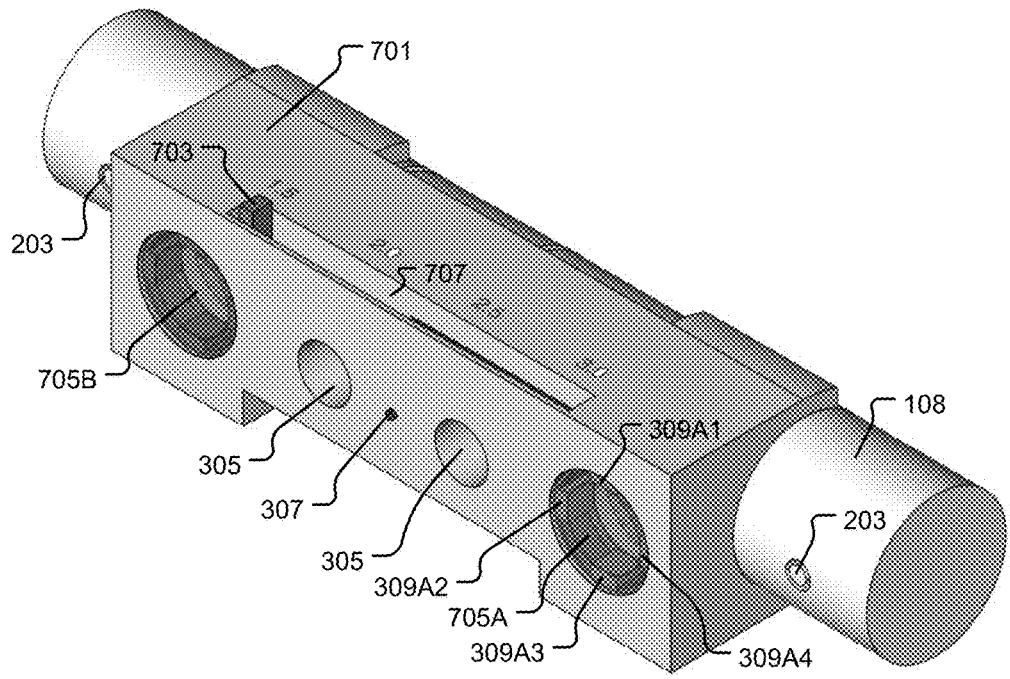
FIG. 7A shows a zoom apparatus attached to the camera, where the zoom apparatus includes an adjustable zoom level/setting, in accordance with some embodiments of the present invention.
Figure 7B:
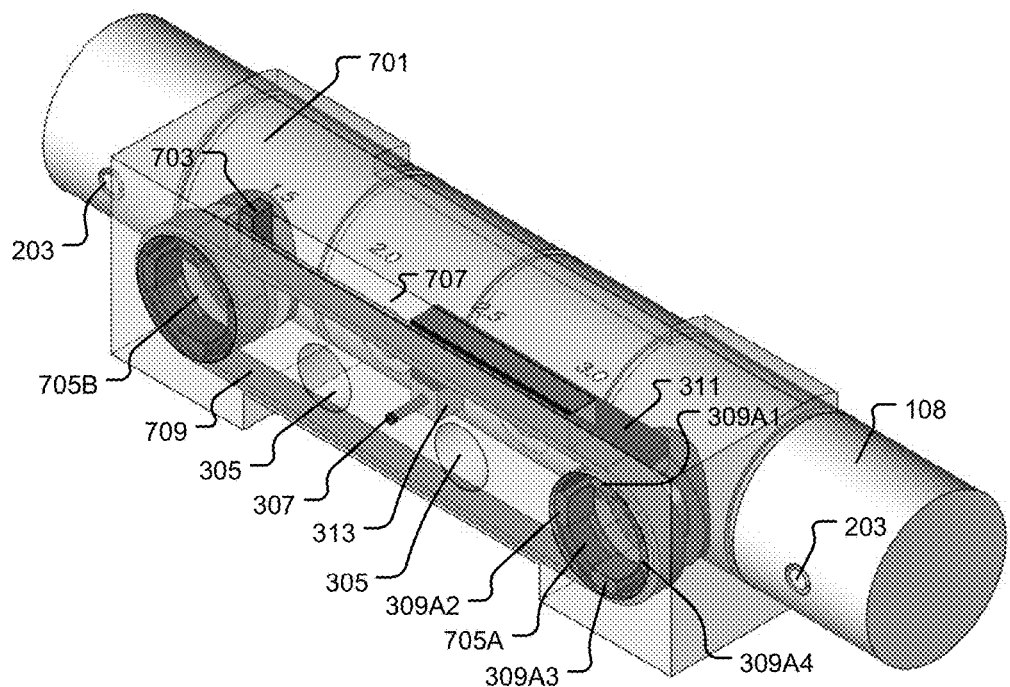
FIG. 7B shows a transparent view of the zoom apparatus of FIG. 7A attached to the camera, in accordance with some embodiments of the present invention.

FIG. 7A shows a zoom apparatus 701 attached to the camera 108, where the zoom apparatus 701 includes an adjustable zoom level/setting, in accordance with some embodiments of the present invention. FIG. 7B shows a transparent view of the zoom apparatus 701 of FIG. 7A attached to the camera 108, in accordance with some embodiments of the present invention. The zoom apparatus 701 includes a body structure configured to attach to the camera 108 in a manner similar to that previously described with regard to the zoom apparatus 301. The zoom apparatus 701 also includes the audio passages 305 and the second optical output 307, as previously described with regard to zoom apparatus 301. The zoom apparatus 701 also includes a first zoom lens system 705A and a second zoom lens system 705B. The zoom apparatus 701 includes a zoom selection control 703 configured to provide for setting of a zoom level/setting by the user 100. In the example embodiment of FIG. 7A, the zoom selection control 703 can be translated along a channel 707 to provide for adjustment of the zoom level/setting of the zoom apparatus 701. In the example embodiment of FIG. 7A, the zoom apparatus 701 provides for selection of any of four different zoom levels/settings, e.g., 1.5, 2.0, 2.5, and 3.0, where the zoom level/setting represents a multiple of the base focal length of the lenses 201 of the camera 108. It should be understood that the example zoom levels/settings presented with regard to the example embodiment of the zoom apparatus 701 of FIG. 7A are not intended to be limiting. In various embodiments, the zoom apparatus 701 can include any number of zoom levels/settings greater than one. Also, in various embodiments, the zoom levels/settings can be set to essentially any values, i.e., to any multiple of the base focal length of the lenses 201 of the camera 108.

Figure 7C:
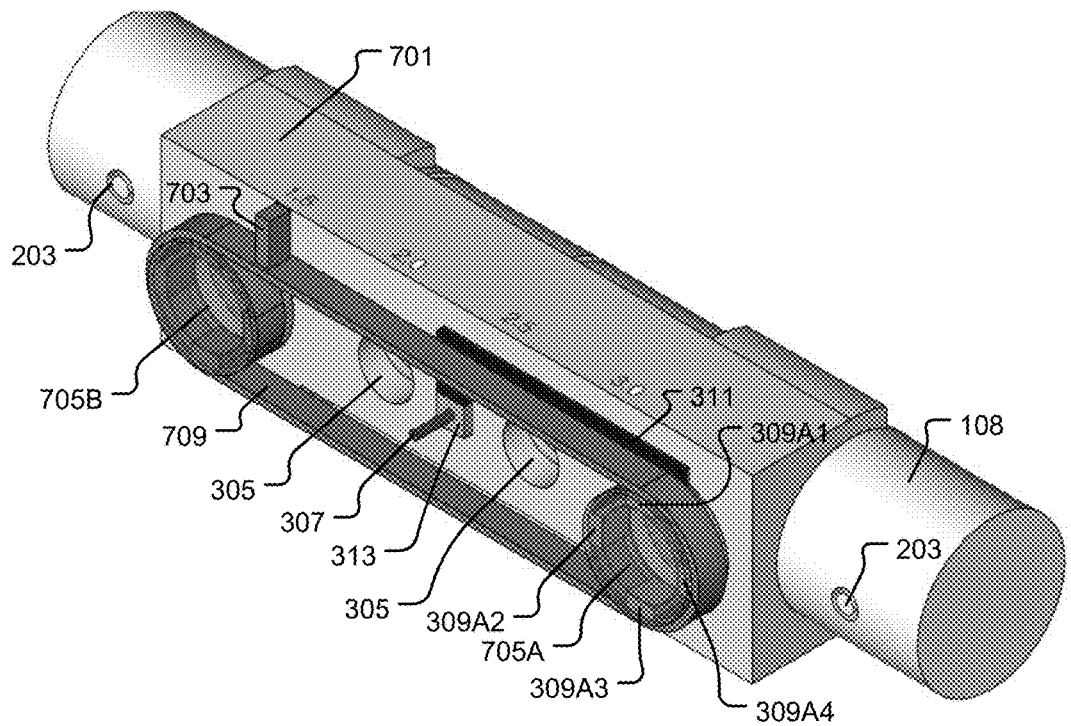
FIG. 7C shows a cut-away view of the zoom apparatus of FIG. 7A to reveal the band, in accordance with some embodiments of the present invention.

In the example zoom apparatus 701, translation of the zoom selection control 703 along the channel 707 causes movement of a band 709 and associated mechanical linkages to in turn cause a corresponding adjustment, e.g., rotation, of the first zoom lens system 705A and the second zoom lens system 705B, to affect adjustment of the zoom level/setting of the zoom apparatus 701. The zoom selection control 703 and the band 709 and associated mechanical linkages are configured to maintain each of the first zoom lens system 705A and the second zoom lens system 705B at a substantially same zoom level/setting. FIG. 7C shows a cut-away view of the zoom apparatus 701 of FIG. 7A to reveal the band 709, in accordance with some embodiments of the present invention.

The zoom apparatus 701 includes a first zoom indicator optical output 309A1, a second zoom indicator optical output 309A2, a third zoom indicator optical output 309A3, and a fourth zoom indicator optical output 309A4. The zoom apparatus also includes the optical waveguide 311 and the optical input 313 as previously described with regard to zoom apparatus 301 of FIG. 3B. As the zoom selection control 703 is translated along the channel 707, the band 709 moves to cause rotation of each of the first zoom indicator optical output 309A1, the second zoom indicator optical output 309A2, the third zoom indicator optical output 309A3, and the fourth zoom indicator optical output 309A4 about the first zoom lens system 705A, such that a different one of the first zoom indicator optical output 309A1, the second zoom indicator optical output 309A2, the third zoom indicator optical output 309A3, and the fourth zoom indicator optical output 309A4 is positioned to receive light from the optical waveguide 311 at the different zoom levels/settings. Also, the optical waveguide 311 and each of the first zoom indicator optical output 309A1, the second zoom indicator optical output 309A2, the third zoom indicator optical output 309A3, and the fourth zoom indicator optical output 309A4 can be formed to manipulate the light from the light source 205 to indicate which of the plurality of selectable zoom levels/settings is currently selected.

Therefore, as shown in FIG. 7B, at the zoom level/setting of 1.5, the first zoom indicator optical output 309A1 is positioned to receive light from the optical waveguide 311 and project light into the designated area within the field of view of the corresponding lens 201 of the camera 108. The first zoom indicator optical output 309A1 can be configured to project the light into the lens 201 of the camera in a first visible pattern that is indicative of the 1.5 zoom level/setting (see visible pattern 401A in FIG. 4A as example). In this manner, one or more of the camera 108, the computing system 106, and the cloud gaming provider 112 is/are able to discern that the zoom apparatus 701 is attached to the camera 108 and that the zoom apparatus 701 is set at the 1.5 zoom level/setting.

Figure 7D:
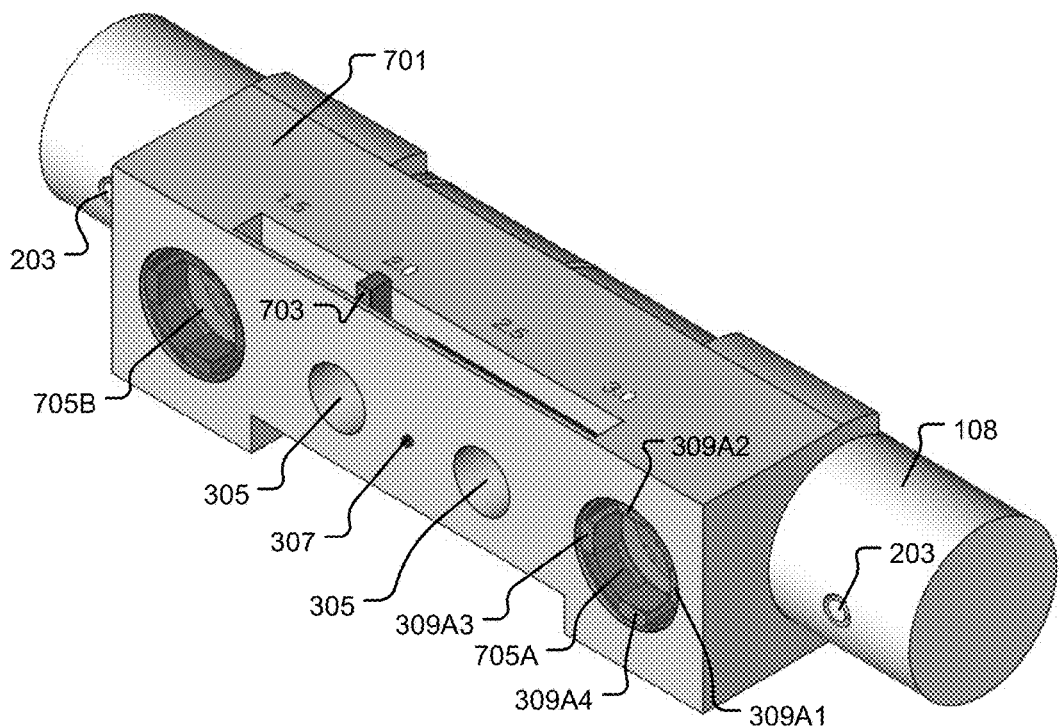
FIG. 7D shows the zoom selection control translated along the channel to the 2.0 zoom level/setting, in accordance with some embodiments of the present invention.

FIG. 7D shows the zoom selection control 703 translated along the channel 707 to the 2.0 zoom level/setting, in accordance with some embodiments of the present invention. At the zoom level/setting of 2.0, the second zoom indicator optical output 309A2 is positioned to receive light from the optical waveguide 311 and project light into the designated area within the field of view of the corresponding lens 201 of the camera 108. The second zoom indicator optical output 309A2 can be configured to project the light into the lens 201 of the camera in a second visible pattern that is indicative of the 2.0 zoom level/setting (see visible pattern 401B in FIG. 4B as example). In this manner, one or more of the camera 108, the computing system 106, and the cloud gaming provider 112 is/are able to discern that the zoom apparatus 701 is attached to the camera 108 and that the zoom apparatus 701 is set at the 2.0 zoom level/setting.

Figure 7E:
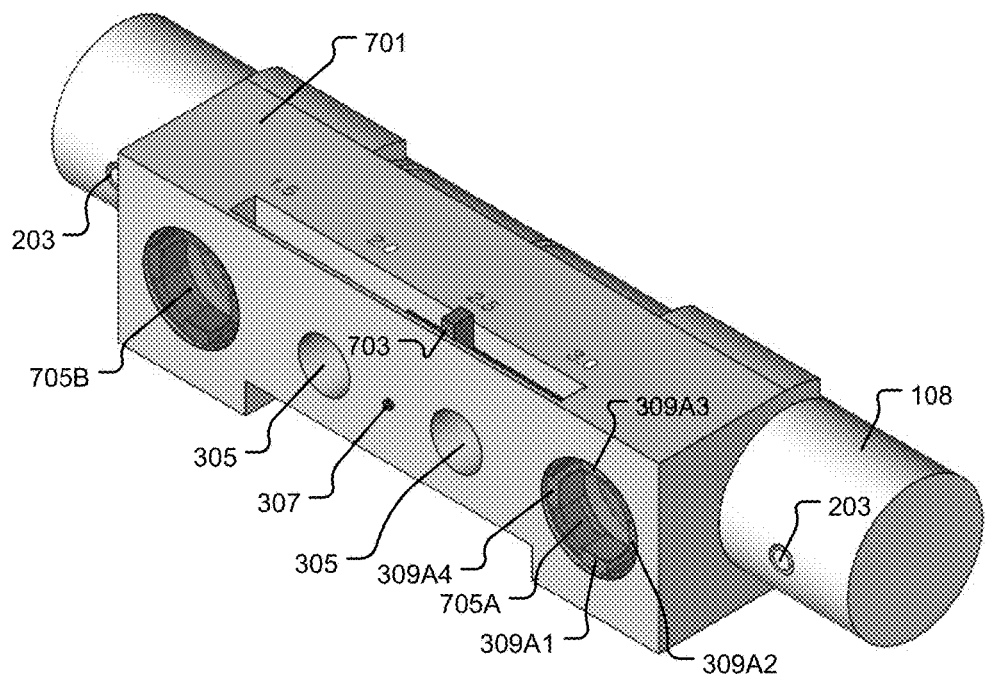
FIG. 7E shows the zoom selection control translated along the channel to the 2.5 zoom level/setting, in accordance with some embodiments of the present invention.

FIG. 7E shows the zoom selection control 703 translated along the channel 707 to the 2.5 zoom level/setting, in accordance with some embodiments of the present invention. At the zoom level/setting of 2.5, the third zoom indicator optical output 309A3 is positioned to receive light from the optical waveguide 311 and project light into the designated area within the field of view of the corresponding lens 201 of the camera 108. The third zoom indicator optical output 309A3 can be configured to project the light into the lens 201 of the camera in a third visible pattern that is indicative of the 2.5 zoom level/setting (see visible pattern 401C in FIG. 4C as example). In this manner, one or more of the camera 108, the computing system 106, and the cloud gaming provider 112 is/are able to discern that the zoom apparatus 701 is attached to the camera 108 and that the zoom apparatus 701 is set at the 2.5 zoom level/setting.

Figure 7F:
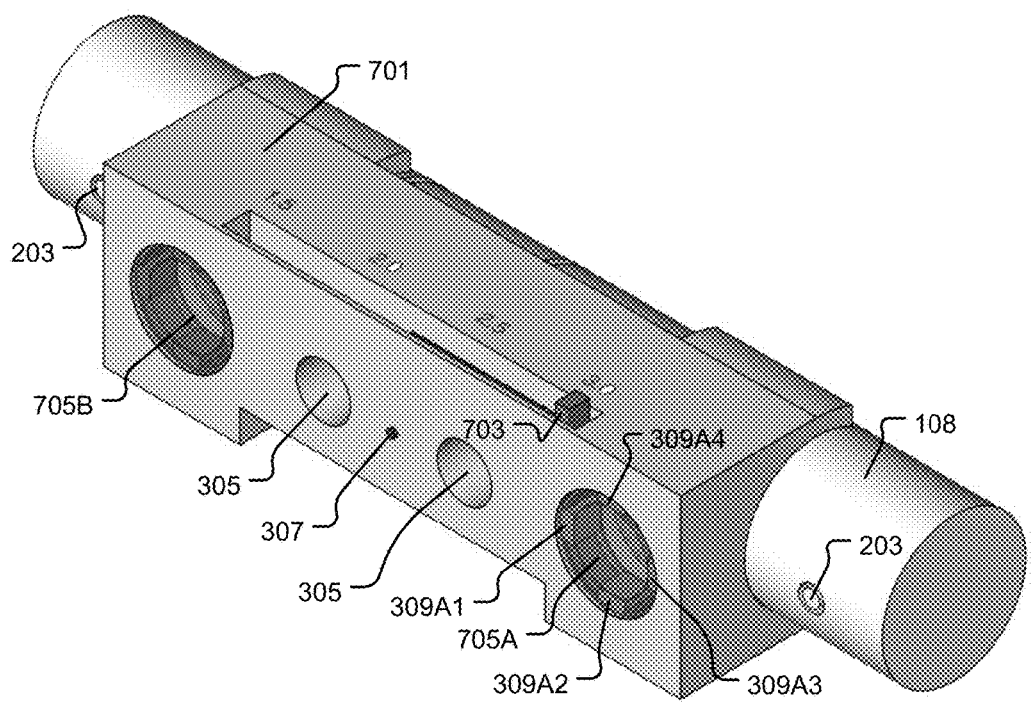
FIG. 7F shows the zoom selection control translated along the channel to the 3.0 zoom level/setting, in accordance with some embodiments of the present invention.

FIG. 7F shows the zoom selection control 703 translated along the channel 707 to the 3.0 zoom level/setting, in accordance with some embodiments of the present invention. At the zoom level/setting of 3.0, the fourth zoom indicator optical output 309A4 is positioned to receive light from the optical waveguide 311 and project light into the designated area within the field of view of the corresponding lens 201 of the camera 108. The fourth zoom indicator optical output 309A4 can be configured to project the light into the lens 201 of the camera in a fourth visible pattern that is indicative of the 3.0 zoom level/setting (see visible pattern 401D in FIG. 4D as example). In this manner, one or more of the camera 108, the computing system 106, and the cloud gaming provider 112 is/are able to discern that the zoom apparatus 701 is attached to the camera 108 and that the zoom apparatus 701 is set at the 3.0 zoom level/setting. Therefore, it should be understood that the optical waveguide 311 can be formed to utilize a different one of the first zoom indicator optical output 309A1, the second zoom indicator optical output 309A2, the third zoom indicator optical output 309A3, and the fourth zoom indicator optical output 309A4 optical output in conjunction with selection of a different one of the plurality of selectable zoom levels/settings.

Figure 8A:
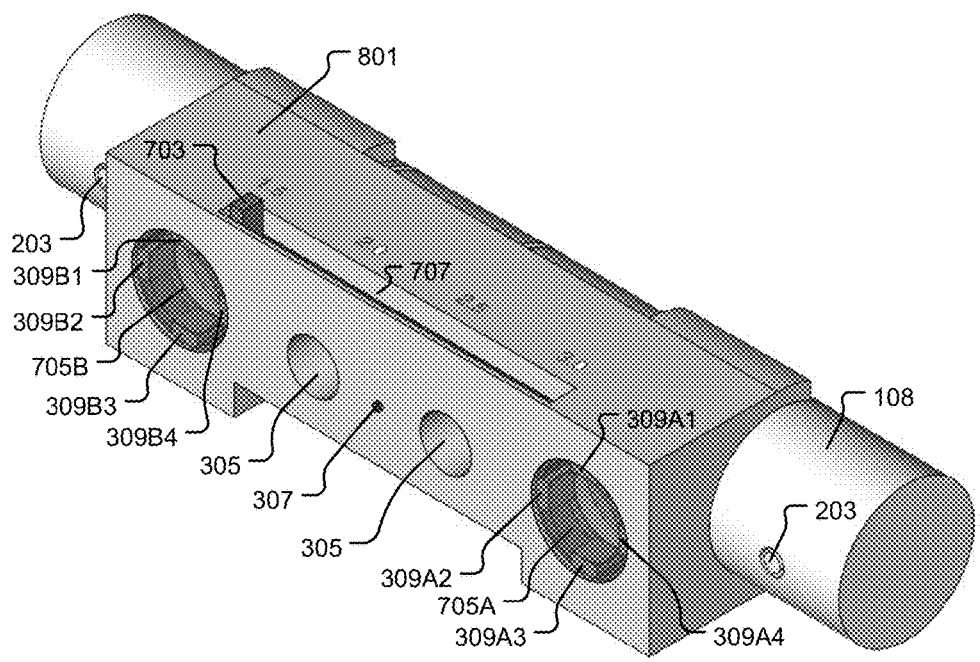
FIG. 8A shows a zoom apparatus attached to the camera, where the zoom apparatus includes an adjustable zoom level/setting, and where the zoom apparatus is configured to direct light from the light source on the camera into both lenses of the camera, in accordance with some embodiments of the present invention.
Figure 8B:
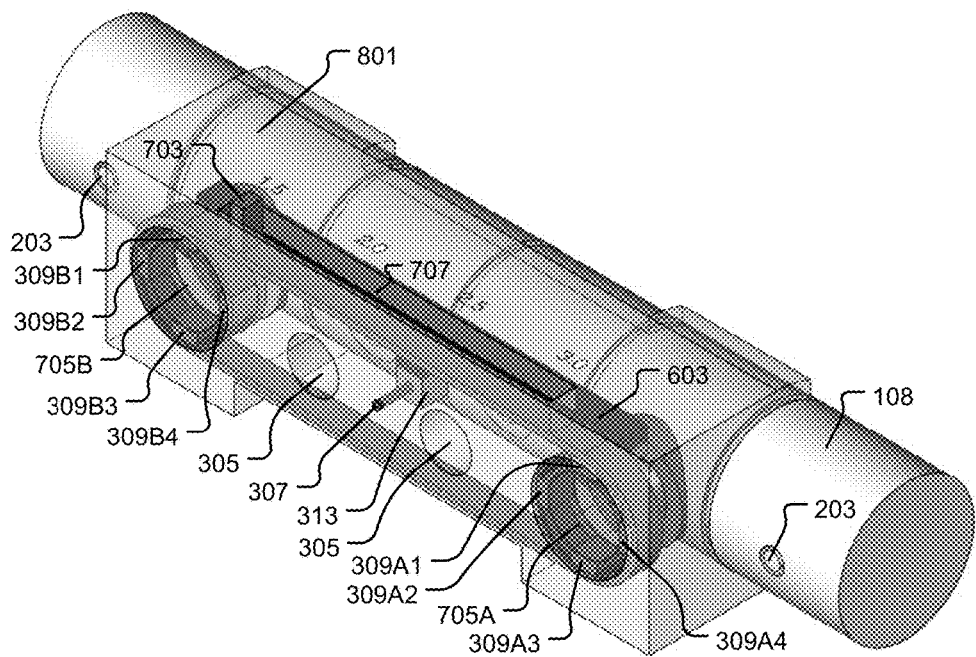
FIG. 8B shows a transparent view of the zoom apparatus of FIG. 8A, in accordance with some embodiments of the present invention.
Figure 8C:
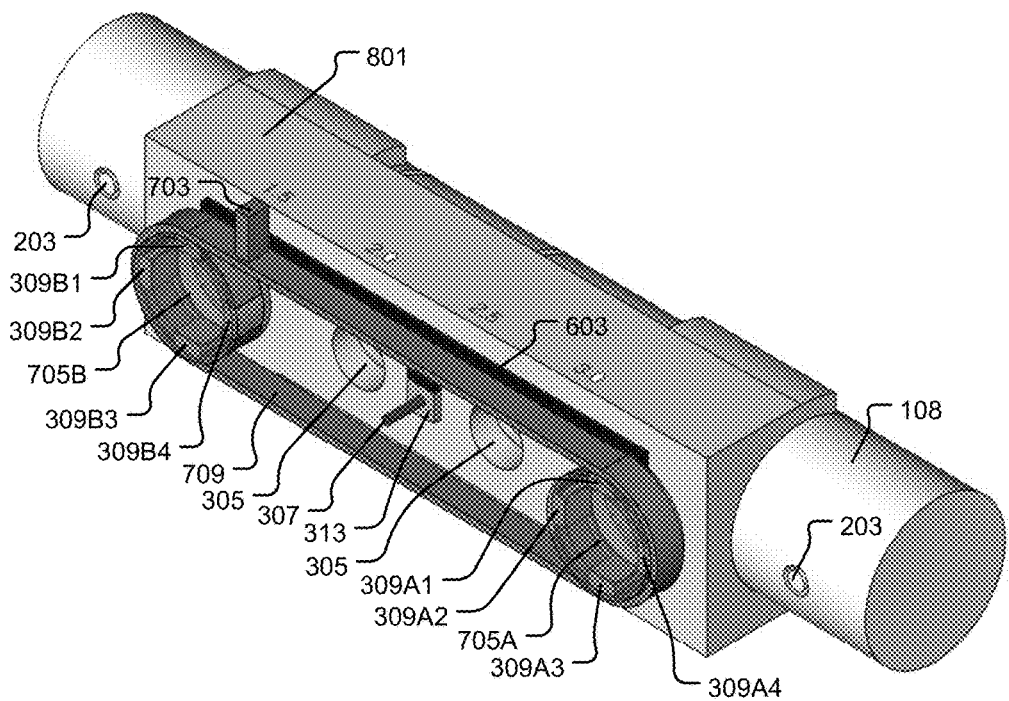
FIG. 8C shows a cut-away view of the zoom apparatus of FIG. 8A to reveal the optical waveguide, in accordance with some embodiments of the present invention.

FIG. 8A shows a zoom apparatus 801 attached to the camera 108, where the zoom apparatus 801 includes an adjustable zoom level/setting, and where the zoom apparatus 801 is configured to direct light from the light source 205 on the camera 108 into both lenses 201 of the camera 108, in accordance with some embodiments of the present invention. FIG. 8B shows a transparent view of the zoom apparatus 801 of FIG. 8A, in accordance with some embodiments of the present invention. The zoom apparatus 801 includes a body structure configured to attach to the camera 108 in a manner similar to that previously described with regard to the zoom apparatus 301. The zoom apparatus 801 includes the first zoom lens system 705A, the second zoom lens system 705B, the audio passages 305, the optical input 313, and the second optical output 307, as previously described with regard to the zoom apparatus 301. The zoom apparatus 801 also includes the optical waveguide 603 configured to direct light from the optical input 313 to optical outputs at each of the first zoom lens system 705A and the second zoom lens system 705B. FIG. 8C shows a cut-away view of the zoom apparatus 801 of FIG. 8A to reveal the optical waveguide 603, in accordance with some embodiments of the present invention.

The zoom apparatus 801 includes the zoom selection control 703, as described with regard to the zoom apparatus 701 of FIG. 7A, configured to provide for setting of a zoom level/setting by the user 100. In the example embodiment of FIG. 8A, the zoom selection control 703 can be translated along the channel 707 to provide for adjustment of the zoom level/setting of the zoom apparatus 801. In the example embodiment of FIG. 8A, the zoom apparatus 801 provides for selection of any of four different zoom levels/settings, e.g., 1.5, 2.0, 2.5, and 3.0, where the zoom level/setting represents a multiple of the base focal length of the lenses 201 of the camera 108. It should be understood that the example zoom levels/settings presented with regard to the example embodiment of the zoom apparatus 801 of FIG. 8A are not intended to be limiting. In various embodiments, the zoom apparatus 801 can include any number of zoom levels/settings greater than one. Also, in various embodiments, the zoom levels/settings can be set to essentially any values, i.e., to any multiple of the base focal length of the lenses 201 of the camera 108.

In the example zoom apparatus 801, translation of the zoom selection control 703 along the channel 707 causes movement of the band 709 and associated mechanical linkages to in turn cause a corresponding adjustment, e.g., rotation, of the first zoom lens system 705A and the second zoom lens system 705B, to affect adjustment of the zoom level/setting of the zoom apparatus 801. The zoom selection control 703 and the band 709 and associated mechanical linkages are configured to maintain each of the first zoom lens system 705A and the second zoom lens system 705B at a substantially same zoom level/setting.

Like the zoom apparatus 701 of FIG. 7A, the zoom apparatus 801 includes the first zoom indicator optical output 309A1, the second zoom indicator optical output 309A2, the third zoom indicator optical output 309A3, and the fourth zoom indicator optical output 309A4, each configured to project light from the light source 205 of the camera 108 into the designated area within the field of view of the corresponding lens 201 of the camera 108 when positioned next to the optical waveguide 603. The optical waveguide 603 and the optical input 313 is the same as previously described with regard to the zoom apparatus 601 of FIG. 6A. The zoom apparatus 801 also includes a fifth zoom indicator optical output 309B1, a sixth zoom indicator optical output 309B2, a seventh zoom indicator optical output 309B3, and an eighth zoom indicator optical output 309B4, each configured to project light from the light source 205 of the camera 108 into the designated area within the field of view of the corresponding lens 201 of the camera 108 when positioned next to the optical waveguide 603.

As the zoom selection control 703 is translated along the channel 707, the band 709 moves to cause rotation of each of the first zoom indicator optical output 309A1, the second zoom indicator optical output 309A2, the third zoom indicator optical output 309A3, and the fourth zoom indicator optical output 309A4 about the first zoom lens system 705A, and to cause rotation of each of the fifth zoom indicator optical output 309B1, the sixth zoom indicator optical output 309B2, the seventh zoom indicator optical output 309B3, and the eighth zoom indicator optical output 309B4 about the second zoom lens system 705B. In this manner, at the different zoom levels/settings, a different one of the first zoom indicator optical output 309A1, the second zoom indicator optical output 309A2, the third zoom indicator optical output 309A3, and the fourth zoom indicator optical output 309A4 is positioned to receive light from the optical waveguide 603. And, at the different zoom levels/settings, a different one of the fifth zoom indicator optical output 309B1, the sixth zoom indicator optical output 309B2, the seventh zoom indicator optical output 309B3, and the eighth zoom indicator optical output 309B4 is positioned to receive light from the optical waveguide 603. Also, the optical waveguide 603 and each of the first zoom indicator optical output 309A1, the second zoom indicator optical output 309A2, the third zoom indicator optical output 309A3, and the fourth zoom indicator optical output 309A4 can be formed to manipulate the light from the light source 205 to indicate which of the plurality of selectable zoom levels/settings is currently selected. And, similarly, the optical waveguide 603 and each of the fifth zoom indicator optical output 309B1, the sixth zoom indicator optical output 309B2, the seventh zoom indicator optical output 309B3, and the eighth zoom indicator optical output 309B4 can be formed to manipulate the light from the light source 205 to indicate which of the plurality of selectable zoom levels/settings is currently selected.

Therefore, as shown in FIG. 8A, at the zoom level/setting of 1.5, the first zoom indicator optical output 309A1 is positioned to receive light from the optical waveguide 603 and project light into the designated area within the field of view of the corresponding lens 201 of the camera 108, and the fifth zoom indicator optical output 309B1 is positioned to receive light from the optical waveguide 603 and project light into the designated area within the field of view of the corresponding lens 201 of the camera 108. Each of the first zoom indicator optical output 309A1 and the fifth zoom indicator optical output 309B1 can be configured to project the light into the corresponding lens 201 of the camera in a first visible pattern that is indicative of the 1.5 zoom level/setting (see visible pattern 401A in FIG. 4A as example). In this manner, one or more of the camera 108, the computing system 106, and the cloud gaming provider 112 is/are able to discern that the zoom apparatus 801 is attached to the camera 108 and that the zoom apparatus 801 is set at the 1.5 zoom level/setting.

Figure 8D:
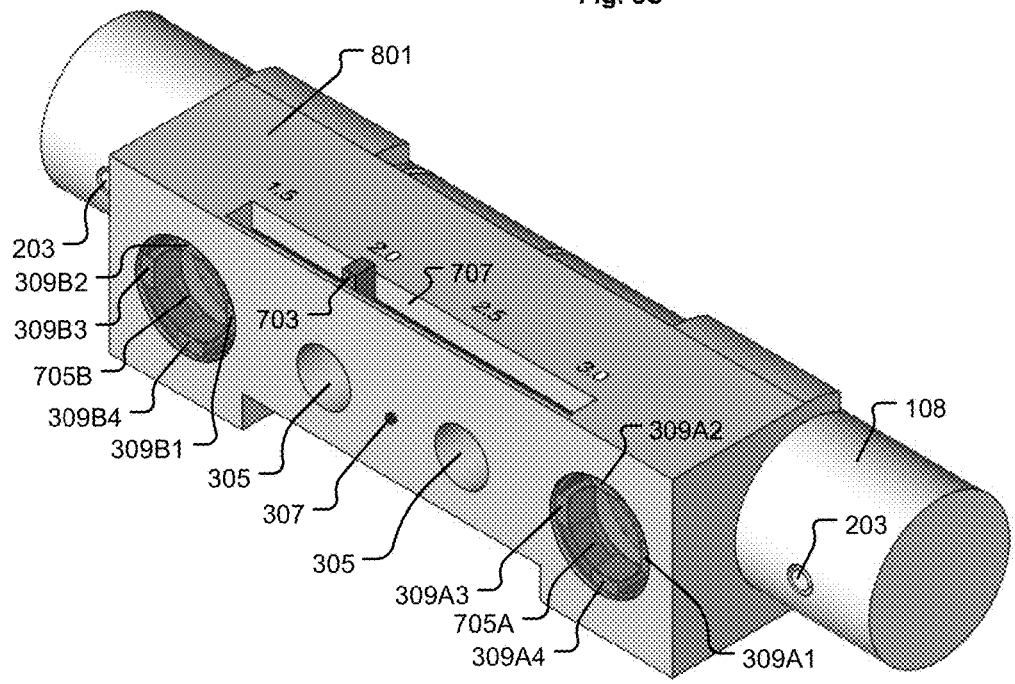
FIG. 8D shows the zoom apparatus with the zoom selection control translated along the channel to the 2.0 zoom level/setting, in accordance with some embodiments of the present invention.

FIG. 8D shows the zoom apparatus 801 with the zoom selection control 703 translated along the channel 707 to the 2.0 zoom level/setting, in accordance with some embodiments of the present invention. At the zoom level/setting of 2.0, the second zoom indicator optical output 309A2 is positioned to receive light from the optical waveguide 603 and project light into the designated area within the field of view of the corresponding lens 201 of the camera 108, and the sixth zoom indicator optical output 309B2 is positioned to receive light from the optical waveguide 603 and project light into the designated area within the field of view of the corresponding lens 201 of the camera 108. Each of the second zoom indicator optical output 309A2 and the sixth zoom indicator optical output 309B2 can be configured to project the light into the corresponding lens 201 of the camera in a second visible pattern that is indicative of the 2.0 zoom level/setting (see visible pattern 401B in FIG. 4B as example). In this manner, one or more of the camera 108, the computing system 106, and the cloud gaming provider 112 is/are able to discern that the zoom apparatus 801 is attached to the camera 108 and that the zoom apparatus 801 is set at the 2.0 zoom level/setting.

Figure 8E:
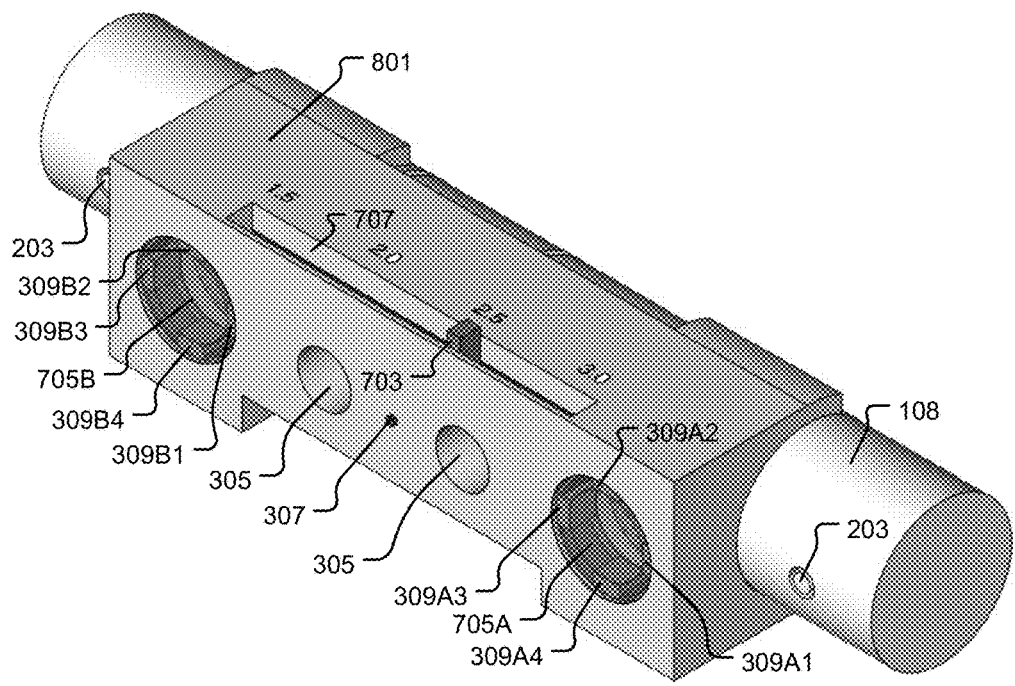
FIG. 8E shows the zoom apparatus with the zoom selection control translated along the channel to the 2.5 zoom level/setting, in accordance with some embodiments of the present invention.

FIG. 8E shows the zoom apparatus 801 with the zoom selection control 703 translated along the channel 707 to the 2.5 zoom level/setting, in accordance with some embodiments of the present invention. At the zoom level/setting of 2.5, the third zoom indicator optical output 309A3 is positioned to receive light from the optical waveguide 603 and project light into the designated area within the field of view of the corresponding lens 201 of the camera 108, and the seventh zoom indicator optical output 309B3 is positioned to receive light from the optical waveguide 603 and project light into the designated area within the field of view of the corresponding lens 201 of the camera 108. Each of the third zoom indicator optical output 309A3 and the seventh zoom indicator optical output 309B3 can be configured to project the light into the corresponding lens 201 of the camera in a third visible pattern that is indicative of the 2.5 zoom level/setting (see visible pattern 401C in FIG. 4C as example). In this manner, one or more of the camera 108, the computing system 106, and the cloud gaming provider 112 is/are able to discern that the zoom apparatus 801 is attached to the camera 108 and that the zoom apparatus 801 is set at the 2.5 zoom level/setting.

Figure 8F:
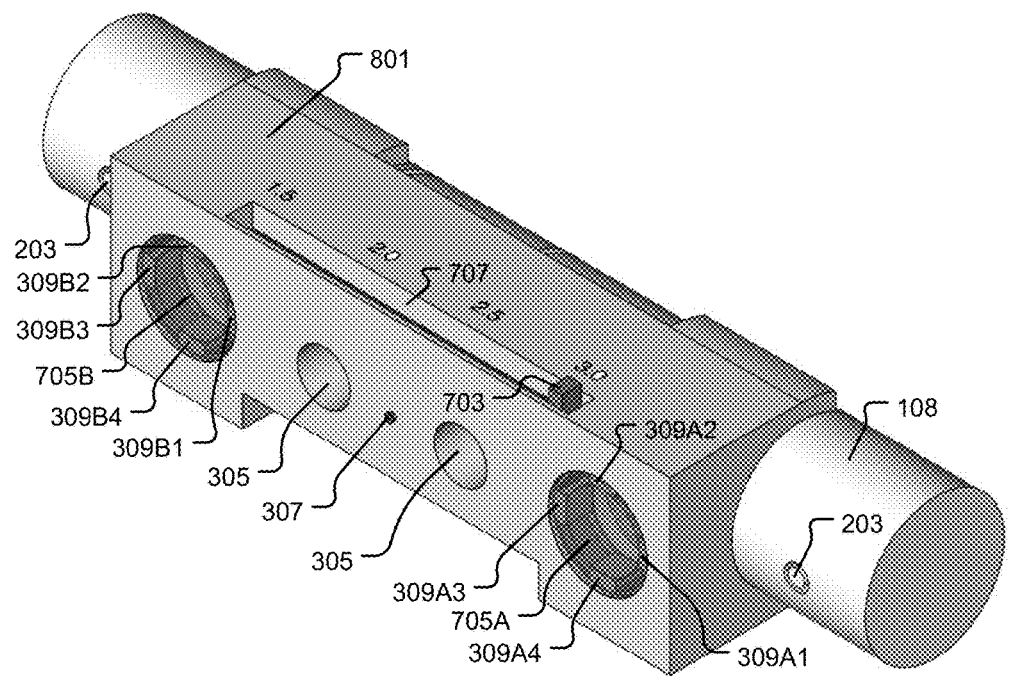
FIG. 8F shows the zoom apparatus with the zoom selection control translated along the channel to the 3.0 zoom level/setting, in accordance with some embodiments of the present invention.

FIG. 8F shows the zoom apparatus 801 with the zoom selection control 703 translated along the channel 707 to the 3.0 zoom level/setting, in accordance with some embodiments of the present invention. At the zoom level/setting of 3.0, the fourth zoom indicator optical output 309A4 is positioned to receive light from the optical waveguide 603 and project light into the designated area within the field of view of the corresponding lens 201 of the camera 108, and the eighth zoom indicator optical output 309B4 is positioned to receive light from the optical waveguide 603 and project light into the designated area within the field of view of the corresponding lens 201 of the camera 108. Each of the fourth zoom indicator optical output 309A4 and the eighth zoom indicator optical output 309B4 can be configured to project the light into the corresponding lens 201 of the camera in a fourth visible pattern that is indicative of the 3.0 zoom level/setting (see visible pattern 401D in FIG. 4D as example). In this manner, one or more of the camera 108, the computing system 106, and the cloud gaming provider 112 is/are able to discern that the zoom apparatus 801 is attached to the camera 108 and that the zoom apparatus 801 is set at the 3.0 zoom level/setting.

Figure 9:
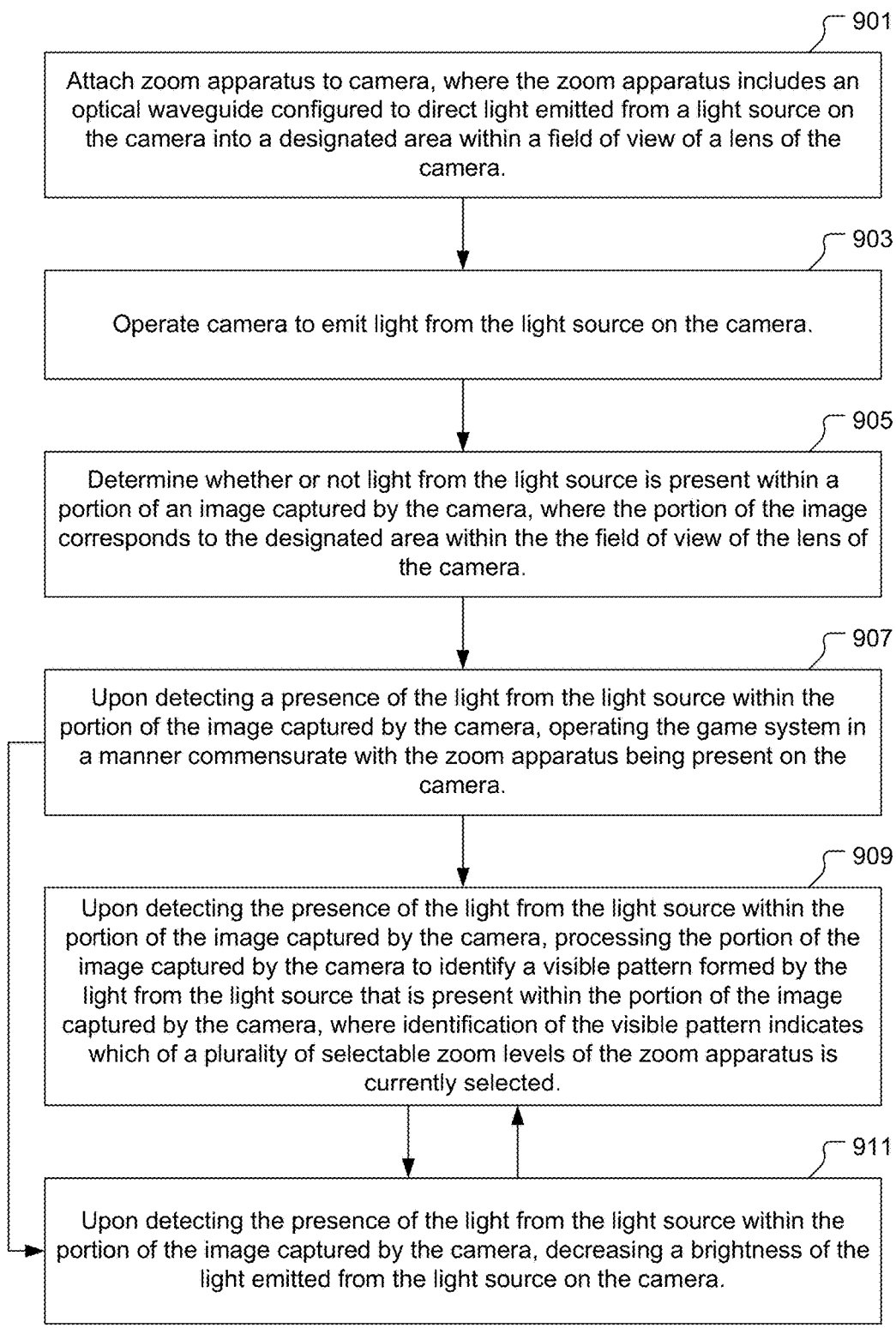
FIG. 9 shows a flowchart of a method for operating a camera of a game system, in accordance with some embodiments of the present invention.

FIG. 9 shows a flowchart of a method for operating a camera of a game system, in accordance with some embodiments of the present invention. The method includes an operation 901 for attaching a zoom apparatus to the camera. The zoom apparatus includes an optical waveguide configured to direct light emitted from a light source on the camera into a designated area within a field of view of a lens of the camera. In various embodiments, the optical waveguide is configured to transmit some of the light emitted from the light source on the camera at an exterior location on the zoom apparatus. The method also includes an operation 903 for operating the camera to emit light from the light source on the camera. The method also includes an operation 905 for determining whether or not light from the light source is present within a portion of an image captured by the camera, where the portion of the image corresponds to the designated area within the field of view of the lens of the camera. The method also includes an operation 907 for operating the game system in a manner commensurate with the zoom apparatus being present on the camera upon detecting a presence of the light from the light source within the portion of the image captured by the camera.

In some embodiments, the method can also include an operation 909 in which upon detecting the presence of the light from the light source within the portion of the image captured by the camera, the portion of the image captured by the camera is processed to identify a visible pattern formed by the light from the light source that is present within the portion of the image captured by the camera, where identification of the visible pattern indicates which of a plurality of selectable zoom levels/settings of the zoom apparatus is currently selected. Also, in some embodiments, the method can include an operation 911 in which upon detecting the presence of the light from the light source within the portion of the image captured by the camera and after determining a zoom level/setting of the zoom apparatus, a brightness of the light emitted from the light source on the camera is decreased for a period of time. Also, in some embodiments, the camera can include an inertial measurement device, such as an accelerometer, which can be used to indicate when a re-check of the presence of the zoom apparatus on the camera should be performed. For example, after the presence of the zoom apparatus on the camera is detected and the corresponding zoom level/setting is determined, the light source on the camera can be dimmed until the accelerometer on the camera indicates that the camera has moved or been disturbed in some manner that possibly indicates removal or adjustment of the zoom apparatus. Then, the light source on the camera can be increased in brightness from its dimmed state to re-check for the presence of the zoom apparatus and the corresponding zoom level/setting. It should be appreciated that dimming of the light source on the camera when the zoom apparatus and corresponding zoom level/setting are known may reduce the likelihood that the light from the light source that is projected toward the lens of the camera will cause problems with object identification and tracking within the images captured by the camera. It should be understood that in various embodiments operations 909 and 911 can be optionally performed in either a sequential manner in any order or in a simultaneous manner.

Figure 10:
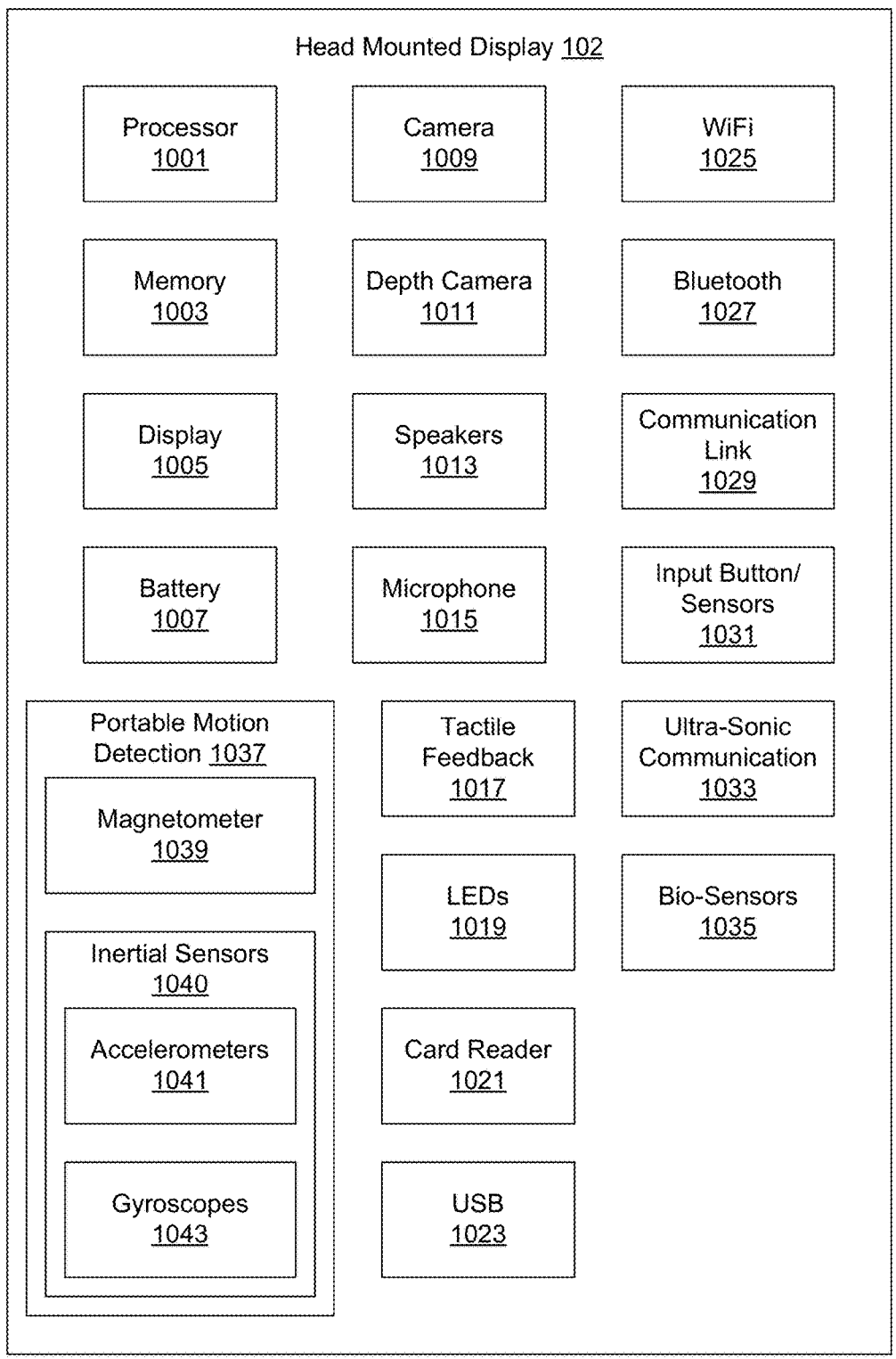
FIG. 10 shows a block-level architecture of the head mounted display, in accordance with an example embodiment of the present invention.

FIG. 10 shows a block-level architecture of the head mounted display 102, in accordance with an example embodiment of the present invention. It should be understood that more or less components can be included or excluded from the head mounted display 102 than what is shown in FIG. 10, depending on the configuration and functions enabled. The head mounted display 102 may include a processor 1001 for executing program instructions. A memory 1003 is provided for data storage purposes, and may include both volatile and non-volatile memory. A display 1005 is included which provides a visual interface that a user may view. The display 1005 can be defined by one single display, or in the form of a separate display screen for each eye. When two display screens are provided, it is possible to provide left-eye and right-eye video content separately. Separate presentation of video content to each eye, for example, can provide for better immersive control of three-dimensional content of the virtual reality scene.

A battery 1007 may be provided as a power source for the head mounted display 102. In other embodiments, the power source can include an outlet connection to power. In other embodiments, an outlet connection to power and a battery 1007 may be provided. In some embodiments, the head mounted display 102 obtains power from the same cable or can connect to another cable. In some embodiments, the head mounted display 102 can have a battery 1007 that is rechargeable, so as to avoid extra power cords.

A motion detection module 1037 may include any of various kinds of motion sensitive hardware, such as a magnetometer 1039, an accelerometer 1041, and a gyroscope 1043. The magnetometer 1039 measures the strength and direction of the magnetic field in the vicinity of the head mounted display 102. In some embodiments, three magnetometers 1039 are used within the head mounted display 102, ensuring an absolute reference for the world-space yaw angle. In some embodiments, the magnetometer 1039 is designed to span the Earth's magnetic field, which is +/−80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In some embodiments, the accelerometer 1041 is used together with the magnetometer 1039 to obtain the inclination and azimuth of the head mounted display 102.

The accelerometer 1041 is a device for measuring acceleration and gravity induced reaction forces. Single and multiple axis (e.g., six-axis) models are able to detect magnitude and direction of the acceleration in different directions. The accelerometer 1041 is used to sense inclination, vibration, and shock. In one embodiment, three accelerometers 1041 are used to provide the direction of gravity, which gives an absolute reference for two angles (world-space pitch and world-space roll).

The gyroscope 1043 is a device for measuring or maintaining orientation, based on the principles of angular momentum. In one embodiment, three gyroscopes 1043 provide information about movement across the respective coordinate axes (x, y, and z) based on inertial sensing. The gyroscopes 1043 help in detecting fast rotations. However, the gyroscopes 1043 can drift overtime without the existence of an absolute reference. This requires resetting the gyroscopes 1043 periodically, which can be done using other available information, such as positional/orientation determination based on visual tracking of an object, accelerometer, magnetometer, etc.

A camera 1009 is provided for capturing images and image streams of the real-world environment to which the head mounted display 102 is exposed. More than one camera 1009 (optionally) may be included in the head mounted display 102, including a camera 1009 that is directed away from the head mounted display 102 toward the real-world environment and a camera 1009 that is used for tracking the eyes of the user wearing the head mounted display 102. Additionally, a depth camera 1011 may be included in the head mounted display 102 for sensing depth information of objects in the real-world environment to which the head mounted display 102 is exposed.

The head mounted display 102 includes speakers 1013 for providing audio output. Also, a microphone 1015 may be included for capturing audio from the real-world environment, including sounds from the ambient environment, speech made by the user, etc. The head mounted display 102 includes tactile feedback module 1017 for providing tactile feedback to the user. In one embodiment, the tactile feedback module 1017 is capable of causing movement and/or vibration of the head mounted display 102 so as to provide tactile feedback to the user.

LEDs 1019 are provided as visual indicators of statuses of the head mounted display 102. For example, an LED may indicate battery level, power on, etc. LEDs 1019 can also be used for visual tracking of the position and movement of the head mounted display 102 by a camera viewing the real-world environment in which the head mounted display 102 is located. A card reader 1021 is provided to enable the head mounted display 102 to read and write information to and from a memory card. A USB interface 1023 is included as one example of an interface for enabling connection of peripheral devices, or connection to other devices, such as other portable devices, computers, etc. In various embodiments of the head mounted display 102, any of various kinds of interfaces may be included to enable greater connectivity of the head mounted display 102.

A WiFi module 1025 may be included for enabling connection of the head mounted display 102 to the Internet via wireless networking technologies. Also, the head mounted display 102 may include a Bluetooth module 1027 for enabling wireless connection to other devices. A communications link 1029 may also be included for connection to other devices. In one embodiment, the communications link 1029 utilizes infrared transmission for wireless communication. In other embodiments, the communications link 1029 may utilize any of various wireless or wired transmission protocols for communication with other devices.

Input buttons/sensors 1031 are included to provide an input interface for the user. Any of various kinds of input interfaces may be included, such as buttons, gestures, touchpad, joystick, trackball, etc. An ultra-sonic communication module 1033 may be included in the head mounted display 102 for facilitating communication with other devices via ultra-sonic technologies.

The head mounted display 102 can also include one or more bio-sensors 1035 to enable detection of physiological data from the user wearing the head mounted display 102. In some embodiments, the bio-sensors 1035 include one or more dry electrodes for detecting bio-electric signals of the user through the user's skin, voice detection, eye tracking to identify a user's gaze, eye retina detection to identify users/profiles, etc.

It should be understood that the components of the head mounted display 102 as shown in FIG. 10 are examples of components that may be included in head mounted display 102, and do not represent all possible components that can be included in the head mounted display 102. For example, in various embodiments, the head mounted display 102 may or may not include some of the components shown in FIG. 10. And, in some embodiments, the head mounted display 102 may include additional components not shown in FIG. 10.

Figure 11:
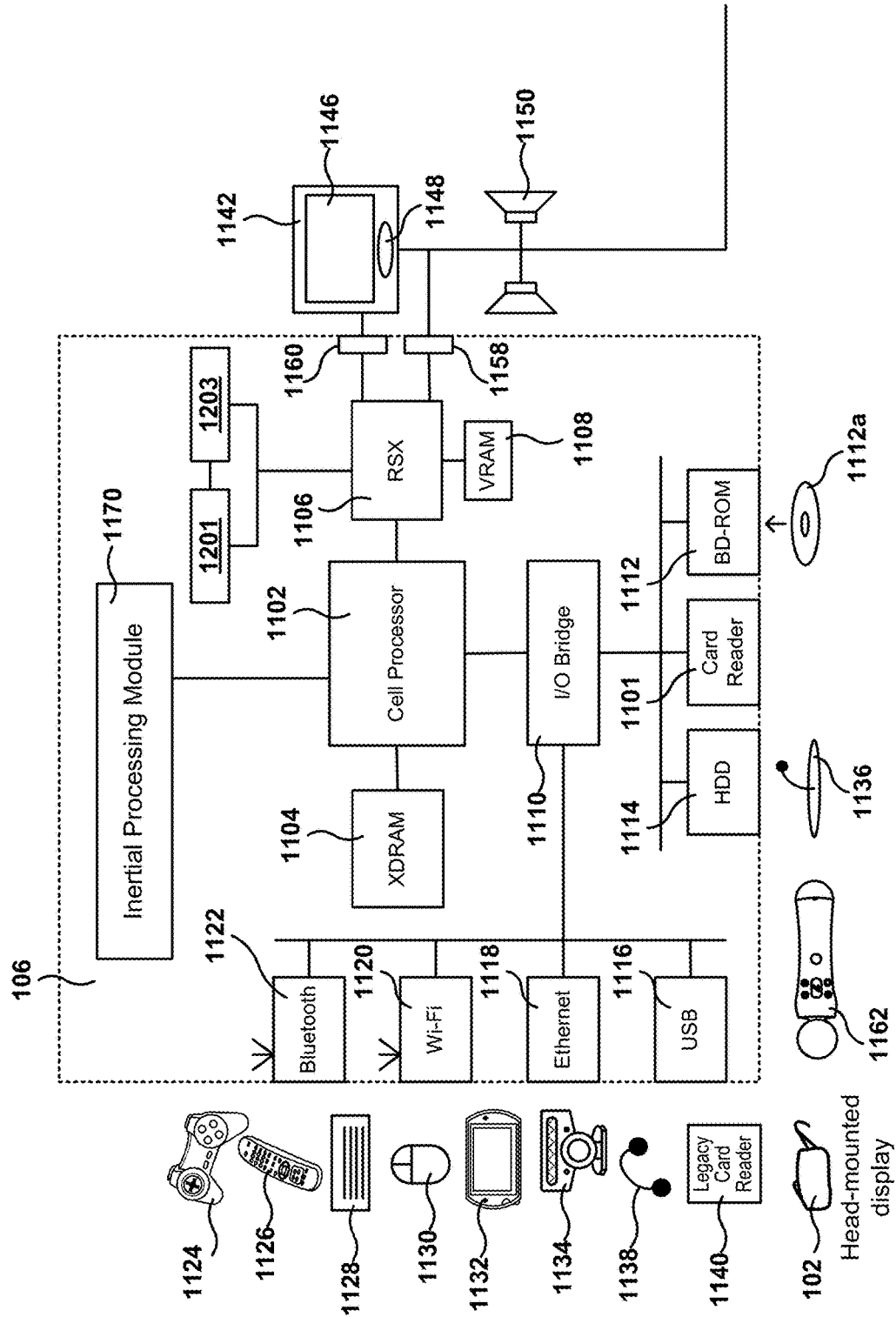
FIG. 11 shows an example block-level architecture of the computer system and other interfacing hardware that may be used to implement some embodiments of the present invention.

FIG. 11 shows an example block-level architecture of the computer system 106 and other interfacing hardware that may be used to implement some embodiments of the present invention. In some embodiments, the computer system 106 may be the Sony® PlayStation® entertainment device. The term PlayStation® as used herein refers to any of the original PlayStation®, the PlayStation 2®, the PlayStation 3®, the PlayStation 4®, or any future version of the PlayStation® gaming system. The computer system 106 can include a cell processor 1102, a Rambus® dynamic random access memory (XDRAM) unit 1104, a reality synthesizer graphics unit 1106 with a dedicated video random access memory (VRAM) unit 1108, and an I/O bridge 1110. The computer system 106 can also include a Blu Ray® Disk BD-ROM® optical disk reader 1112 for reading from a disk 1112a and a removable slot-in hard disk drive (HDD) 1114, accessible through the I/O bridge 1110. Optionally, the computer system 106 also includes a memory card reader 1101 for reading compact flash memory cards, Memory Stick® memory cards and the like, which is similarly accessible through the I/O bridge 1110. The I/O bridge 1110 also connects to six Universal Serial Bus (USB) 2.0 ports 1116, a gigabit Ethernet port 1118, an IEEE 802.11b/g wireless network (Wi-Fi) port 1120, and a Bluetooth® wireless link port 1122 capable of supporting of up to seven Bluetooth connections.

In operation, the I/O bridge 1110 handles all wireless, USB and Ethernet data, including data from one or more game controllers 1162 and 1124. For example, when a user is playing a game, the I/O bridge 1110 receives data from the game controller 1162 and 1124 via a Bluetooth link and directs it to the cell processor 1102, which updates the current state of the game accordingly.

The wireless, USB and Ethernet ports also provide connectivity for other peripheral devices in addition to game controllers 1162 and 1124, such as a remote control 1126, a keyboard 1128, a mouse 1130, a portable entertainment device 1132 such as a Sony PSP® entertainment device, a video camera such as a PlayStation® Eye Camera 1134, a shape object 1136, and a microphone 1138. Such peripheral devices may therefore in principle be connected to the computer system 106 wirelessly. For example, the portable entertainment device 1132 may communicate via a Wi-Fi ad-hoc connection, while the shape object 1136 may communicate via a Bluetooth link.

The provision of these interfaces means that the computer system 106 is also potentially compatible with other peripheral devices such as digital video recorders (DVRs), set-top boxes, digital cameras, portable media players, Voice over Internet Protocol (IP) telephones, mobile telephones, printers and scanners. In addition, a legacy memory card reader 1140 may be connected to the system unit via a USB port 1116, enabling the reading of memory cards of the kind used by the earlier PlayStation devices.

The game controllers 1162 and 1124 are operable to communicate wirelessly with the computer system 106 via the Bluetooth link, or to be connected to a USB port, thereby also providing power by which to charge the battery of the game controllers 1162 and 1124. Game controllers 1162 and 1124 can also include memory, a processor, a memory card reader, permanent memory such as flash memory, light emitters such as an illuminated spherical section, light emitting diodes (LEDs), or infrared lights, microphone and speaker for ultrasound communications, an acoustic chamber, a digital camera, an internal clock, a recognizable shape facing the game console, and wireless communications using protocols such as Bluetooth®, WiFi™, etc. The recognizable shape can be in a shape substantially of a sphere, a cube, parallelogram, a rectangular parallelepiped, a cone, a pyramid, a soccer ball, a football or rugby ball, an imperfect sphere, a section of a sphere, a truncated pyramid, a truncated cone, a baseball bat, a truncated cube, a polyhedron, a star, etc., or a combination of two of more of these shapes.

Game controller 1124 is a controller designed to be used with two hands, and game controller 1162 is a single-hand controller with a ball attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Sony PSP® portable device may be used as a controller. In the case of the Sony PSP® portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1126 is also operable to communicate wirelessly with the computer system 106 via a Bluetooth link. The remote control 1126 includes controls suitable for the operation of the Blu Ray™ Disk BD-ROM reader 1112 and for the navigation of disk content. The Blu Ray™ Disk BD-ROM reader 1112 is operable to read CD-ROMs compatible with any PlayStation devices, in addition to conventional pre-recorded and recordable CDs, and so-called Super Audio CDs. The reader 1112 is also operable to read DVD-ROMs compatible with any Playstation devices, in addition to conventional pre-recorded and recordable DVDs. The reader 1112 is further operable to read BD-ROMs compatible with any PlayStation devices, as well as conventional pre-recorded and recordable Blu-Ray Disks.

The computer system 106 is operable to supply audio and video, either generated or decoded by the PlayStation device via the Reality Synthesizer graphics unit (RSX) 1106, through audio and video connectors to a display and sound output device 1142 such as a monitor or television set having a display 1146 and one or more loudspeakers 1148, or stand-alone speakers 1150. In some embodiments, voice and gaze inputs are utilized to play sound toward specific audio speakers according to the POG of the user. The audio connectors 1158 may include conventional analogue and digital outputs while the video connectors 1160 may variously include component video, S-video, composite video and one or more High Definition Multimedia Interface (HDMI) outputs. Consequently, video output may be in formats such as PAL or NTSC, or in 720p, 1080i or 1080p high definition. Audio processing (generation, decoding and so on) is performed by the cell processor 1302. The PlayStation 3 device's operating system supports Dolby® 5.1 surround sound, Dolby® Theatre Surround (DTS), and the decoding of 7.1 surround sound from Blu-Ray® disks.

In some embodiments, the system 106 includes a focus direction processing module 1201 configured to determine a focus direction of a user within the virtual reality scene displayed within the head mounted display 102. In some embodiments, the focus direction processing module 1201 is configured to determine the focus direction of the user within the virtual reality scene based on movement of the head mounted display 102, or based on eye gaze direction of the user within the virtual reality scene, or based on both movement of the head mounted display 102 and eye gaze direction of the user within the virtual reality scene. Also, the system 106 includes an object-of-focus processing module 1203 configured to determine an object of current focus of the user within the virtual reality scene based on the focus direction determined by the focus direction processing module 1201, where the focus direction of the user is directed toward the object of current focus of the user. The object-of-focus processing module 1203 is configured to direct the rendering engine 1106 to generate an adjustment of the virtual reality scene in which the object of current focus of the user moves toward a point of view of the user within the virtual reality scene. In some embodiments, the adjustment of the virtual reality scene enlarges the object of current focus of the user to substantially fill a field of view of the user within the virtual reality scene. Also, in some embodiments, the object-of-focus processing module 1203 is configured to direct transmission of audio content associated with the object of current focus of the user to the head mounted display 102.

Additionally, in some embodiments, the object-of-focus processing module 1203 is configured to determine a plurality of objects of current focus of the user within the virtual reality scene based on the focus direction determined by the focus direction processing module 1201 and one or more additional inputs received from the user. And, the object-of-focus processing module 1203 is configured to direct the rendering engine 1106 to generate an adjustment of the virtual reality scene in which each of the plurality of objects of current focus of the user moves toward the point of view of the user within the virtual reality scene. Also, in some embodiments, the object-of-focus processing module 1203 is configured to direct transmission of audio content associated with each of the plurality of objects of current focus of the user to the head mounted display.

The computer system 106 can also include an inertial processing module 1170 in communication with the cell processor 1102. The inertial processing module 1170 is connected to receive inertial sensor data from inertial sensors within the head mounted display 102. The inertial sensor data indicates movement of the head mounted display 102 in accordance with movement of a user by whom the head mounted display 102 is worn. The movement of the user is based on a virtual reality scene displayed within the head mounted display 102.

An application programming interface (API) can be made available to provide applications with access to the functions and outputs of the inertial processing module 1170. The API can be used by multiple applications, e.g., games, in a simultaneous manner. It should be understood that the inertial processing module 1170 can be implemented as software and/or firmware in various embodiments. Also, in some embodiments, portions of the inertial processing module 1170 can be implemented as hardware, such as when rapid data processing is required for application performance.

Although some method operations have been described in a specific order herein, it should be understood that other housekeeping operations may be performed between operations, or operations may be adjusted so that they occur at slightly different times, or may be distributed in a system which allows the occurrence of the processing operations at various intervals associated with the processing. Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Various components utilized with the invention can be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the described embodiments.

What is claimed is:

1. A zoom apparatus for a camera of a game system, comprising:
    a body structure formed to fit over the camera;
    a zoom lens disposed within the body structure so as to be positioned in front of a lens of the camera when the body structure is attached to the camera; and
    an optical waveguide disposed within the body structure, the optical waveguide formed to have an optical input and an optical output, the optical waveguide formed to receive light into the optical input from a light source on the camera when the body structure is attached to the camera, the optical waveguide formed to emit light from the optical output into a designated area within a field of view of the lens of the camera when the body structure is attached to the camera.

2. The zoom apparatus for the camera of the game system as recited in claim 1, wherein the body structure is formed to clip onto an outer structure of the camera.

3. The zoom apparatus for the camera of the game system as recited in claim 1, wherein the optical waveguide includes an optical fiber.

4. The zoom apparatus for the camera of the game system as recited in claim 1, wherein the light source on the camera is a status indicator light for the camera.

5. The zoom apparatus for the camera of the game system as recited in claim 1, wherein the light source on the camera is a light emitting diode.

6. The zoom apparatus for the camera of the game system as recited in claim 1, wherein the light source on the camera is controllable by the game system with respect to one or more of brightness, color, on duration, off duration, and pulsing.

7. The zoom apparatus for the camera of the game system as recited in claim 1, wherein the optical output from which light is emitted into the designated area within the field of view of the lens of the camera is a first optical output, and wherein the optical waveguide includes a second optical output configured to emit some of the light from the light source at an exterior location on the body structure.

8. The zoom apparatus for the camera of the game system as recited in claim 7, wherein the light source on the camera is a status indicator light for the camera, and wherein the second optical output is a substitute status indicator for the camera.

9. The zoom apparatus for the camera of the game system as recited in claim 1, wherein the zoom lens is configured to provide a plurality of selectable zoom levels, and wherein the optical waveguide is formed to manipulate the light from the light source to indicate which of the plurality of selectable zoom levels is currently selected.

10. The zoom apparatus for the camera of the game system as recited in claim 9, wherein the optical waveguide is formed to utilize a different optical output in conjunction with selection of a different one of the plurality of selectable zoom levels.

11. The zoom apparatus for the camera of the game system as recited in claim 10, wherein each different optical output is configured to emit light in a different visible pattern.

12. The zoom apparatus for the camera of the game system as recited in claim 1, wherein the camera includes two lenses, and wherein the zoom apparatus includes two zoom lenses disposed within the body structure so as to be respectively positioned in front of the two lenses of the camera when the body structure is attached to the camera.

13. The zoom apparatus for the camera of the game system as recited in claim 12, wherein the optical waveguide is formed to direct light from the light source on the camera into the designated area within the field of view of one of the two lenses of the camera.

14. The zoom apparatus for the camera of the game system as recited in claim 12, wherein the optical waveguide is formed to direct light emitted from the light source on the camera into the designated area within the field of view of each of the two lenses of the camera.

15. The zoom apparatus for the camera of the game system as recited in claim 12, wherein each of the two zoom lenses is configured to provide a plurality of selectable zoom levels, and wherein the optical waveguide is formed to manipulate the light from the light source to indicate which of the plurality of selectable zoom levels is currently selected for each of the two zoom lenses.

16. A game system, comprising:
    a processing unit configured to execute program instructions for a computer game;
    a camera including a lens and image capturing circuitry configured to capture images of a real-world environment associated with a user of the computer game, the camera configured to communicate captured image data to the processing unit; and
    a zoom apparatus configured to attach to the camera, the zoom apparatus including an optical waveguide configured to direct light emitted from a light source on the camera into a designated area within a field of view of the lens of the camera to provide an indication to the processing unit of attachment of the zoom apparatus to the camera.

17. The game system as recited in claim 16, wherein the processing unit is configured to process the captured image data to determine whether or not light from the light source is present within a portion of an image captured by the camera, wherein the portion of the image corresponds to the designated area within the field of view of the lens of the camera.

18. The game system as recited in claim 16, wherein the optical waveguide is configured to manipulate the light emitted from the light source to indicate which of a plurality of selectable zoom levels is currently selected on the zoom apparatus.

19. A method for operating a camera of a game system, comprising:
    attaching a zoom apparatus to the camera, the zoom apparatus including an optical waveguide configured to direct light emitted from a light source on the camera into a designated area within a field of view of a lens of the camera;
    operating the camera to emit light from the light source on the camera;
    determining whether or not light from the light source is present within a portion of an image captured by the camera, wherein the portion of the image corresponds to the designated area within the field of view of the lens of the camera; and
    upon detecting a presence of the light from the light source within the portion of the image captured by the camera, operating the game system in a manner commensurate with the zoom apparatus being present on the camera.

20. The method for operating the camera of the game system as recited in claim 19, further comprising:
    upon detecting the presence of the light from the light source within the portion of the image captured by the camera, processing the portion of the image captured by the camera to identify a visible pattern formed by the light from the light source that is present within the portion of the image captured by the camera, wherein identification of the visible pattern indicates which of a plurality of selectable zoom levels of the zoom apparatus is currently selected.

21. The method for operating the camera of the game system as recited in claim 19, further comprising:

upon detecting the presence of the light from the light source within the portion of the image captured by the camera and determining a zoom level of the zoom apparatus, decreasing a brightness of the light emitted from the light source on the camera.

22. The method for operating the camera of the game system as recited in claim 21, wherein the optical waveguide is configured to transmit some of the light emitted from the light source on the camera at an exterior location on the zoom apparatus.

23. The method for operating the camera of the game system as recited in claim 21, further comprising:
 detecting movement of the camera; and
 upon detecting movement of the camera, increasing the brightness of the light emitted from the light source on the camera and re-determining whether or not light from the light source is present within the designated area within the field of view of the lens of the camera.

* * * * *